United States Patent
Im et al.

(10) Patent No.: US 10,844,648 B2
(45) Date of Patent: Nov. 24, 2020

(54) MOTOR-INTEGRATED POWER TRUNK OPENING SYSTEM AND VEHICLE HAVING THE SAME

(71) Applicants: Hyundai Motor Company, Seoul (KR); Kia Motors Corporation, Seoul (KR); Pyeong Hwa Automotive Co., Ltd., Daegu (KR)

(72) Inventors: Yong-Hyuck Im, Seoul (KR); Seong-Tae Hong, Suwon-si (KR)

(73) Assignees: Hyundai Motor Company, Seoul (KR); Kia Motors Corporation, Seoul (KR); Pyeong Hwa Automotive Co., Ltd., Daegu (KR)

( * ) Notice: Subject to any disclaimer, the term of this patent is extended or adjusted under 35 U.S.C. 154(b) by 198 days.

(21) Appl. No.: 15/981,663

(22) Filed: May 16, 2018

(65) Prior Publication Data
US 2019/0003234 A1   Jan. 3, 2019

(30) Foreign Application Priority Data
Jun. 28, 2017 (KR) .................. 10-2017-0081826

(51) Int. Cl.
  *E05F 15/63* (2015.01)
  *E05D 3/02* (2006.01)
  (Continued)

(52) U.S. Cl.
  CPC ............... *E05F 15/63* (2015.01); *B60R 5/04* (2013.01); *E05D 5/062* (2013.01); *E05F 1/1207* (2013.01); *E05F 1/1276* (2013.01); *E05D 3/02* (2013.01); *E05D 5/0207* (2013.01); *E05D 2005/067* (2013.01); *E05Y 2201/434* (2013.01); *E05Y 2201/482* (2013.01); *E05Y 2201/624* (2013.01); *E05Y 2201/626* (2013.01); *E05Y 2201/71* (2013.01); *E05Y 2600/46* (2013.01); *E05Y 2600/50* (2013.01); *E05Y 2600/51* (2013.01); *E05Y 2600/56* (2013.01);
  (Continued)

(58) Field of Classification Search
  CPC ....... E05F 15/63; E05F 1/1276; E05F 1/1207; B60R 5/04; E05D 5/062; E05D 3/02; E05D 5/0207; E05Y 2600/626; E05Y 2600/51; E05Y 2600/56; E05Y 2600/50; E05Y 2600/622; E05Y 2600/46; E05Y 2201/624; E05Y 2201/482; E05Y 2201/71; E05Y 2201/626; E05Y 2201/434; E05Y 2800/236; E05Y 2900/548
  USPC .......................................... 296/76
  See application file for complete search history.

(56) References Cited

U.S. PATENT DOCUMENTS

| | | | | |
|---|---|---|---|---|
| 5,563,483 A | * | 10/1996 | Kowall | E05B 81/14 318/266 |
| 7,097,230 B2 | * | 8/2006 | Ishihara | E05F 15/63 296/146.4 |
| 2016/0114759 A1 | * | 4/2016 | Takaya | B60R 21/38 102/530 |

FOREIGN PATENT DOCUMENTS

KR   10-2003-0016582 A   3/2003

* cited by examiner

*Primary Examiner* — Joseph D. Pape
*Assistant Examiner* — Dana D Ivey
(74) *Attorney, Agent, or Firm* — Morgan, Lewis & Bockius LLP

(57) ABSTRACT

A motor-integrated power trunk opening system applied to a vehicle may include a hinge arm which is divided into a power side portion and an interlocking side portion to support left and right end portions of a trunk lid covering a (Continued)

trunk compartment, and an actuator which is mounted to the power side hinge arm and moves the hinge arm upwards using generated power so that the trunk lid opens

19 Claims, 21 Drawing Sheets

(51) Int. Cl.
    *E05D 5/02*           (2006.01)
    *E05D 5/06*           (2006.01)
    *B60R 5/04*           (2006.01)
    *E05F 1/12*            (2006.01)

(52) U.S. Cl.
    CPC ... *E05Y 2600/622* (2013.01); *E05Y 2600/626* (2013.01); *E05Y 2800/236* (2013.01); *E05Y 2900/548* (2013.01)

MOTOR-INTEGRATED POWER TRUNK OPENING SYSTEM AND VEHICLE HAVING THE SAME

CROSS-REFERENCE TO RELATED APPLICATIONS

The present application claims priority to Korean Patent Application No. 10-2017-0081826, filed on Jun. 28, 2017, the entire contents of which is incorporated herein for all purposes by this reference.

BACKGROUND OF THE INVENTION

Field of the Invention

The present invention relates to a trunk opening system; and, more particularly, to a motor-integrated power trunk opening system configured such that a hinge arm for opening a trunk lid is directly operated by the rotation of a motor, and a vehicle having the system.

Description of Related Art

Generally, a trunk compartment which is a storage compartment formed in the rear of a vehicle to load or store luggage is opened by a trunk opening system. The trunk opening system may be embodied as a power trunk opening system using motor power for the sake of operational convenience.

Typically, the power trunk opening system includes a motor, a hinge arm, and a rod and is configured such that the motor is supported on a vehicle body using a mounting bracket coupled to the vehicle body, thus being called a motor-separated power trunk opening system.

In the motor-separated power trunk opening system, when the motor rotates, the hinge arm and the rod are rotated by torque transmitted from the motor, whereby the trunk automatically opens.

However, the motor-separated power trunk opening system has the following disadvantages because the mounting bracket is used to support the motor.

First, since the mounting bracket is fixed to the vehicle body in at least three points, the number of bolting operations using a separate tool for mounting the motor is increased, thus resulting in deterioration in the ease of assembly. Second, it is impossible to simplify the structure due to an increase in the number of bolting operations and the number of bolts resulting from the use of the mounting bracket, thereby leading to an increase in the production cost and the weight of the vehicle. Third, it is difficult to reduce operational noise because of the presence of a power transmitting system having the hinge arm and the rod to be operated to receive rotational power of the motor as well as the presence of the motor mounting portion using the mounting bracket.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a motor-integrated power trunk opening system in which a motor and a link of an actuator are disposed in close contact with a hinge arm so that the length of a motor torque transmission path for the hinge arm can be reduced and, particularly, the number of assembly processes is reduced because of the use of a common coupling structure between the actuator and the hinge arm, thus simplifying the structure, enhancing the ease of assembly, and a mitigating operational noise, and to a vehicle having the motor-integrated power trunk opening system.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the devices as claimed and combinations thereof.

In accordance with various exemplary embodiments of the present invention, there is provided a power trunk opening system including: an actuator mounted to a hinge arm and configured to generate power in a response to an operating signal of a control switch and move the hinge arm upwards from a trunk compartment so that a trunk lid having a predetermined weight opens.

In an exemplary embodiment of the present invention, the actuator may include a motor device coupled with the hinge arm such that rotating force generated by an operation of the motor device in a response to the operating signal is transmitted to the hinge arm, and a link device fixed to a vehicle body panel of the trunk compartment and coupled to or integrated with the motor device such that the link device along with the motor device is rotated by the rotation of the motor device and thus makes movement of the hinge arm. The motor device and the link device may be formed using a hinge arm rotating structure. Alternatively, the motor device and the link device are formed using a vehicle body rotating structure.

In an exemplary embodiment of the present invention, the hinge arm rotating structure may be embodied by a shift fixing structure in which the motor device is rotated relative to the hinge arm so that an intersection angle formed between the motor device and the hinge arm changes, and by a completely fixing structure in which the link device rotates along with the motor device, or is embodied by a completely fixing structure in which the motor device rotates along with the hinge arm, and by a shaft fixing structure in which the link device rotates relative to the motor device.

In an exemplary embodiment of the present invention, the motor device may include a motor gear to be rotated by a motor generating the rotating force, and a motor bracket coupled to the hinge arm. The link device may include a motor link and a hinge arm link coupled to each other by a link shaft and configured to be foldable, and a torsion spring type link spring fixed at respective opposite end portions thereof to the hinge arm link and the link shaft to generate spring moment when the motor link and the hinge arm link are folded onto each other.

In an exemplary embodiment of the present invention, the motor gear may change the intersection angle using rotating force generated by the motor such that the hinge arm is moved upward in the shaft fixing state of the hinge arm and the motor gear. The motor link may rotate interlocking with the change in the intersection angle in the completely fixing state with the motor gear and thus be folded onto the hinge arm link coupled thereto by the link shaft.

In an exemplary embodiment of the present invention, the shaft fixing structure may be formed by coupling a guide hinge bracket of the hinge arm with a motor bracket of the motor gear using a motor rotation shaft, and the rotation of the motor gear may be performed with the motor rotation shaft as a center of the rotation. The completely fixing structure may be formed by coupling or integrating the motor link and the motor gear with each other, or by bracket bolt for threaded coupling.

In an exemplary embodiment of the present invention, the rotating force of the motor gear generated by the motor may move the hinge arm upward in the completely fixing state of the hinge arm and the motor gear. The motor link may rotate interlocking with the motor gear to change the intersection angle in the shaft fixing state of the motor link and the motor gear and thus be folded onto the hinge arm link coupled thereto by the link shaft.

In an exemplary embodiment of the present invention, the completely fixing structure may be formed by coupling a guide hinge bracket of the hinge arm with a motor bracket of the motor gear using a motor fixing shaft, and the motor bracket may be coupled with the hinge arm by a guide pin in a state in which the motor fixing shaft passes through the motor bracket. The shaft fixing structure may be formed by a gear shaft which is coupled to the motor gear while passing through the motor link.

In an exemplary embodiment of the present invention, the vehicle body rotating structure may be embodied by a shaft fixing structure in which the motor device rotates relative to the vehicle body panel, and a completely fixing structure in which the link device rotates along with the motor device and thus pushes or pulls the hinge arm to move the hinge arm upward.

In an exemplary embodiment of the present invention, the motor device may include a motor gear configured to be rotated by a motor that generates the rotating force, and a vehicle body ball joint coupled with a joint bracket fixed to the motor gear, and fixed to the vehicle body panel. The motor gear may rotate relative to the vehicle body panel using the rotating force generated by the motor and rotate the motor link. The link device may include a motor link and a hinge arm link coupled with each other by a link hinge pin to be foldable onto each other, and a link spring configured to generate a spring moment when the motor link and the hinge arm link are folded onto each other. The hinge arm link may push or pull the hinge arm by the rotation of the motor link in a state in which the hinge arm link is fixed with the hinge arm.

In an exemplary embodiment of the present invention, the motor device may include a motor gear to be rotated by a motor that generates the rotating force, and a gear fixing shaft fixed to the vehicle body panel and fixed to the motor gear, and the motor gear may rotate relative to the vehicle body panel using the rotating force generated by the motor and rotate the motor link. The link device may include a motor link and a hinge arm link coupled to each other by a hinge pin to be foldable onto each other, and the hinge arm link may push or pull the hinge arm by the rotation of the motor link in a state in which the hinge arm link is fixed with the hinge arm by a link ball joint.

The hinge arm may be divided into a power side hinge arm and an interlocking side hinge arm to support left and right end portions of the trunk lid, and the actuator may be mounted to the power side hinge arm.

In accordance with various exemplary embodiments of the present invention, there is provided a vehicle including: a power trunk opening system configured such that a motor device configured to generate rotating force rotates relative to a hinge arm and changes an intersection angle formed between the motor device and the hinge arm so that a link device fixed to the motor device is folded by rotation by the motor device and thus moves the hinge arm upward, or the motor device moves the hinge arm upward and the link device is folded by rotation interlocked with the motor device and thus changes the intersection angle; and a trunk compartment provided with a trunk lid supported by the hinge arm so that the trunk lid is opened by the power trunk opening system.

In accordance with various exemplary embodiments of the present invention, there is provided a vehicle including: a power trunk opening system configured such that a motor device configured to generate rotating force rotates relative to a vehicle body panel and thus rotates a link device fixed to the motor device, and the rotation of the link device makes the hinge arm be pushed or pulled so that the hinge arm is moved upward; and a trunk compartment provided with a trunk lid supported by the hinge arm so that the trunk lid is opened by the power trunk opening system.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
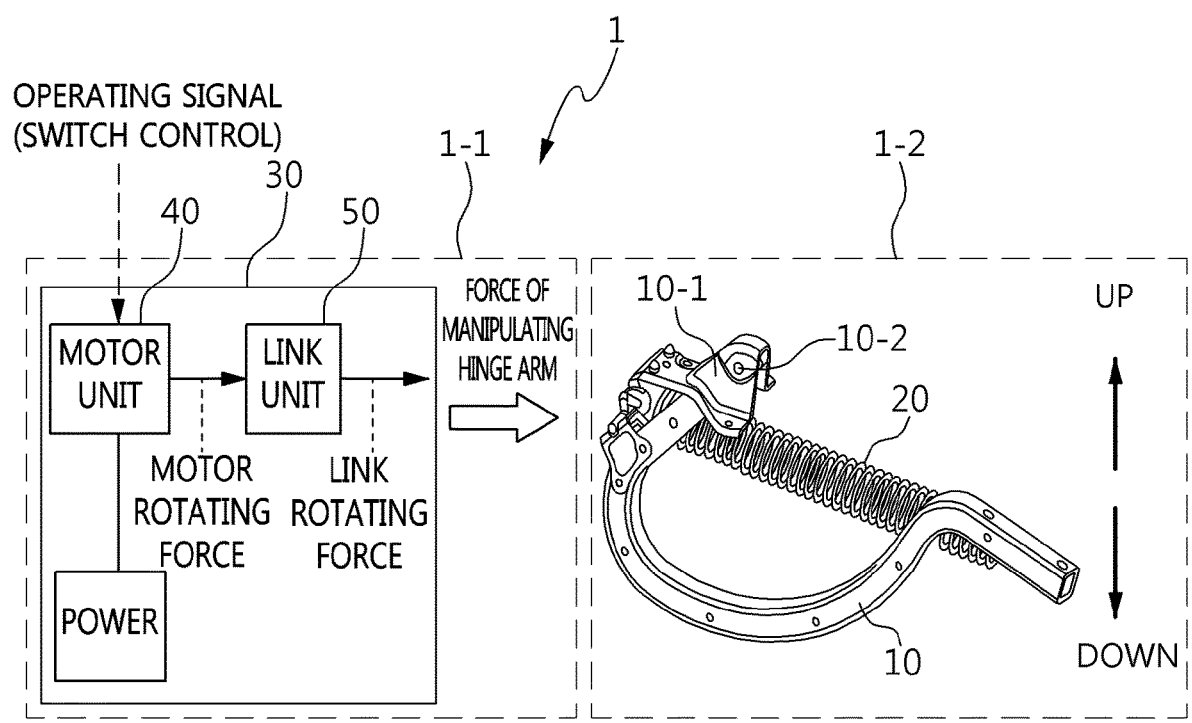
FIG. 1 is a view illustrating the configuration of a motor-integrated power trunk opening system according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described below in more detail with reference to the accompanying drawings to be easily realized by those skilled in the art.

The present invention may, however, be embodied in different forms and may not be construed as limited to the exemplary embodiments set forth herein. In various exemplary embodiments, irrelevant to the present invention may be omitted to avoid obscuring appreciation of the disclosure. Throughout the disclosure, like reference numerals refer to like parts throughout the various figures and embodiments of the present invention.

The drawings are not necessarily to scale and in some instances, proportions may have been exaggerated to clearly illustrate various layers and regions of the embodiments. It will be understood that when an element including a layer, a film, a region, or a plate is referred to as being "above" another element, it can be "immediately above" the other element or intervening elements may also be present.

In contrast, when an element is referred to as being "immediately above" another element, there are no intervening elements present. Furthermore, it will be understood that when an element is referred to as being "entirely" formed on another element, it can be formed on the entire surface (or whole surface) of the other element or cannot be formed at a portion of the edge portion thereof.

Referring to FIG. 1, a power trunk opening system 1 is divided into a power mechanical device 1-1 and an interlocking mechanical device 1-2.

In an exemplary embodiment of the present invention, the power mechanical device 1-1 is formed of an actuator 30 configured to generate power. The actuator 30 includes a motor device 40 which directly applies, to a hinge arm 10, rotating force generated in a response to an operating signal, e.g., a signal generated by manipulating a switch, and a link device 50 which rotates along with the motor device 40 to make movement of the hinge arm 10. For example, the interlocking mechanical device 1-2 includes another hinge arm 10 which makes a pair with the hinge arm 10 of the power mechanical device 1-1, and an elastic member 20 which provides elastic restoring force to the hinge arm 10.

Figure 2:
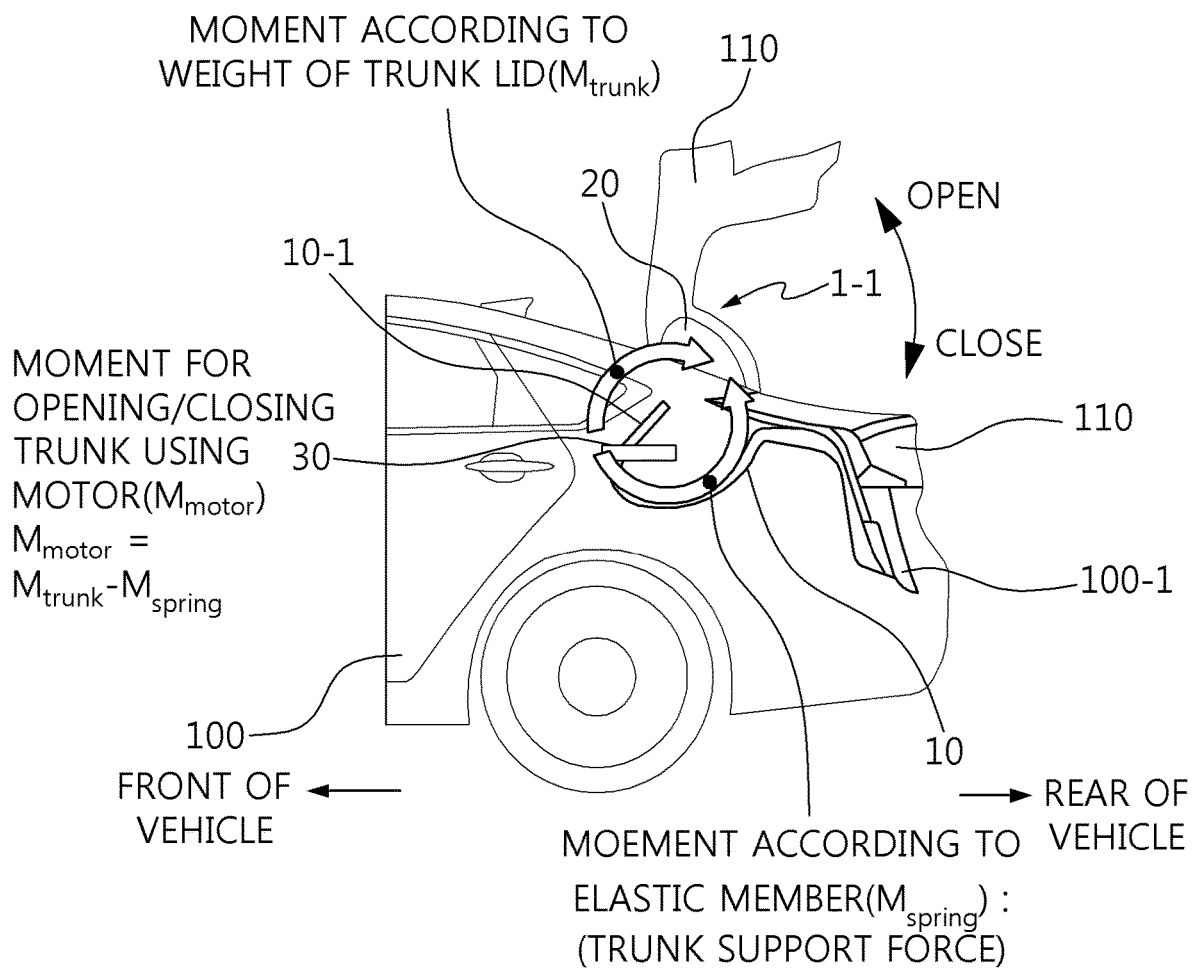
FIG. 2 is a view showing the dynamic relationship of operating moments in the motor-integrated power trunk opening system according to an exemplary embodiment of the present invention.

The power mechanical device 1-1 employs the actuator 30 which utilizes a motor as a power source, and thus generates power needed for the power trunk opening system 1 to open a trunk lid (110, refer to FIG. 2). The interlocking mechanical device 1-2 follows the operation of the power mechanical device 1-1. Therefore, the power trunk opening system 1 is called a motor-integrated power trunk opening system.

Referring to FIG. 2, the actuator 30 is designed using a trunk opening or closing force relationship such that the motor specifications of the motor device 40 can be minimized. Here, with regard to the orientation of the vehicle 100, a side of the vehicle 100 adjacent to an engine compartment refers to the front of the vehicle, and a side of the vehicle 100 adjacent to a trunk compartment 100-1 refers to the rear of the vehicle.

For example, if a trunk closing moment $M_{trunk}$ refers to a force generated by the weight of the trunk lid 110 provided to openably close the trunk compartment 100-1, a trunk opening moment $M_{spring}$ refers to a force generated by spring reaction force of the elastic member 20, and an opening/closing moment $M_{motor}$ refers to a force with which the motor of the motor device 40 moves the trunk lid 110 upward, the opening/closing moment $M_{motor}$ is determined by the following equation.

$$M_{motor} = M_{trunk} - M_{spring}$$

Here, "=" is a sign indicating the equality of two values, and "−" is a sign indicating subtraction between two values. The equation signifies that $M_{motor}$ is set to a difference between $M_{trunk}$ and $M_{spring}$.

Therefore, in the power trunk opening system 1, the motor specifications of the motor device 40 can be optimized by adjusting the spring reaction force of the elastic member 20 with the weight of the trunk lid 110 of the vehicle 100 as the fixed value.

The elastic member 20 employs a gas lifter, or a spring medium formed of a torsion spring or a tensile spring. The elastic member 20 functions as a main component of the power trunk opening system 1 which generates the spring moment for opening the trunk lid. Therefore, a spring moment of a link spring 70 (refer to FIG. 3) used in the actuator 30 may be used, or not, as an auxiliary device of the elastic member 20.

Figure 3:
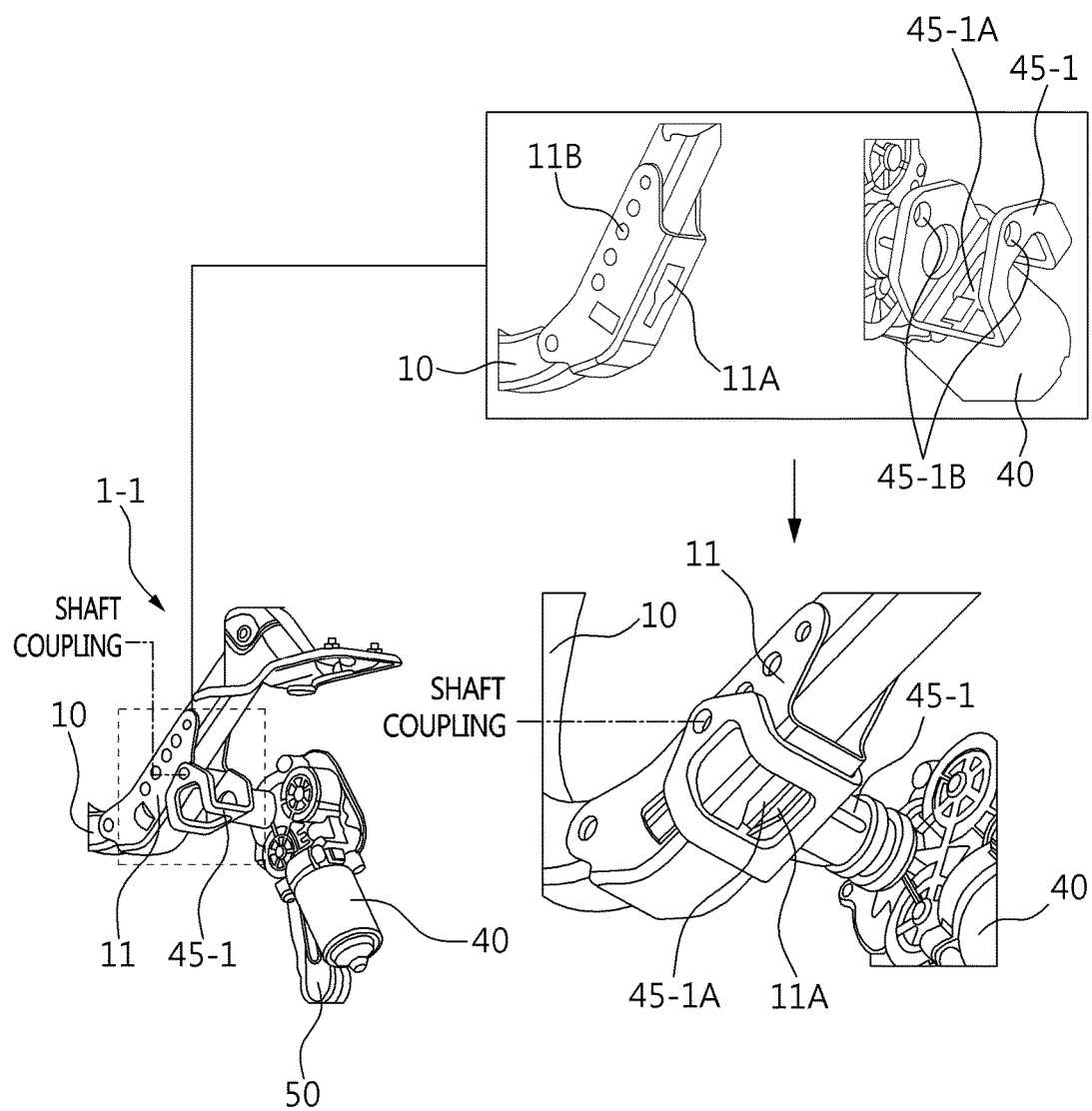
FIG. 3 is a view illustrating an example of a coupling hinge bracket used in common for a hinge arm and an actuator in the motor-integrated power trunk opening system according to an exemplary embodiment of the present invention.

Referring to FIG. 3, a coupling structure of the hinge arm 10 and the actuator 30 may be embodied by coupling a hinge bracket 11 with a connection bracket 45-1. The hinge bracket 11 has a "U"-shaped body configured to enclose the hinge arm 10 and is fixed by welding or bolting. The connection bracket 45-1 has a "U"-shaped body configured to enclose the hinge bracket 11 and is coupled with the actuator 30 in a protrusion shape.

For the present structure, a latch protrusion 11A is provided on the hinge bracket 11, and a latch slot 45-1A is formed in the connection bracket 45-1. The latch protrusion 11A is inserted into the latch slot 45-1A. The hinge bracket 11 has a hinge bracket shaft hole 11B formed in the "U"-shaped body. The connection bracket 45-1 has a connection bracket shaft hole 45-1B formed in the "U"-shaped body. A shaft is coupled into the connection bracket shaft hole 45-1B and the hinge bracket shaft hole 11B in a state in which the connection bracket 45-1 has enclosed the hinge bracket 11, thus forming a coupling force between the hinge bracket 11 and the connection bracket 45-1.

Figure 12:
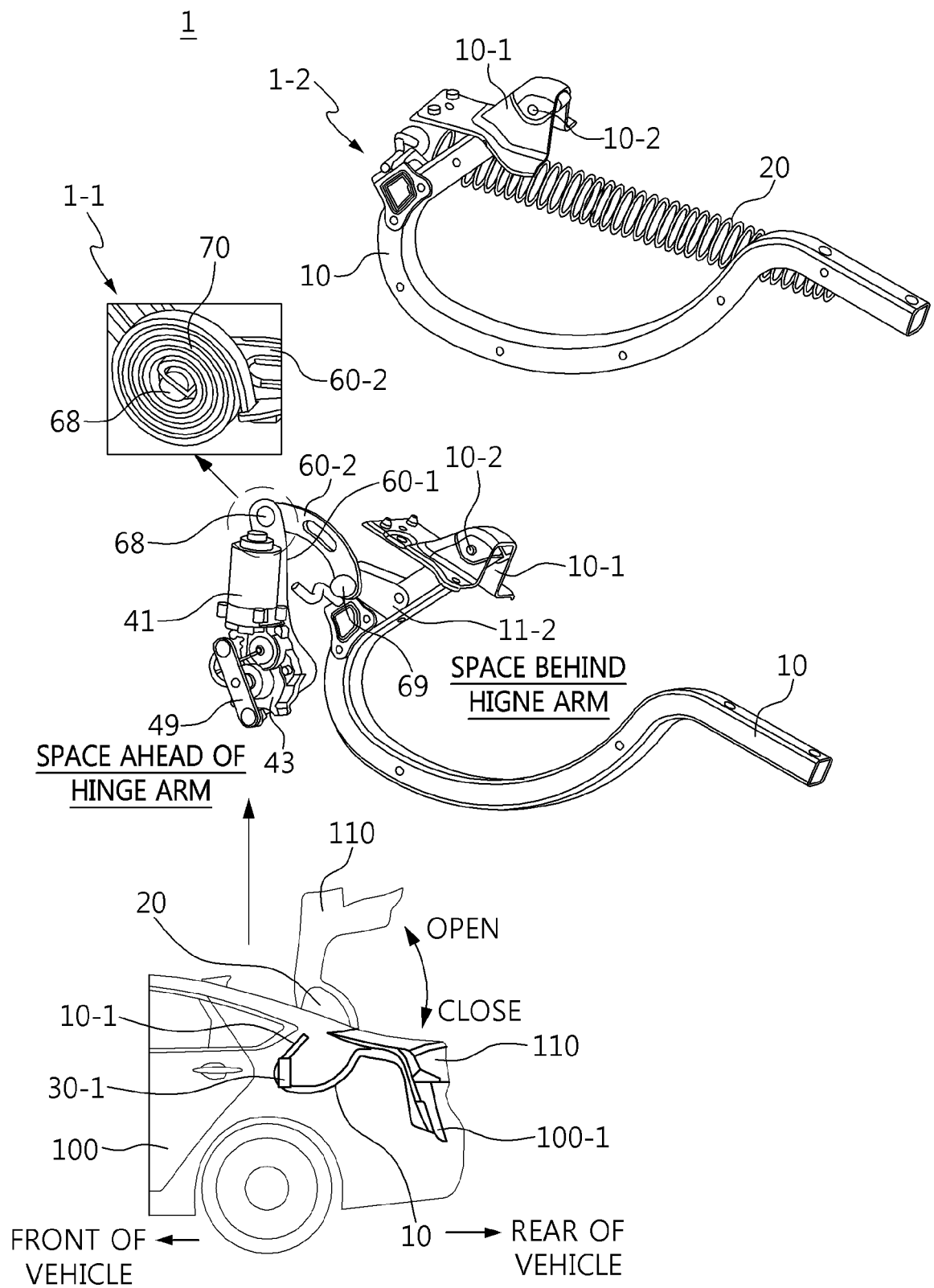
FIG. 12 is a view illustrating an example of a vehicle provided with the motor-integrated power trunk opening system having a vehicle body rotating structure according to an exemplary embodiment of the present invention.

The structure of the hinge bracket 11 may be modified into a guide hinge bracket 11-1 (refer to FIG. 5) or a fixing hinge bracket 11-2 (refer to FIG. 12). The structure of the connection bracket 45-1 may be modified into a motor bracket 45 (refer to FIG. 5) provided to form the actuator 50.

As described above with reference to FIG. 1, FIG. 2, and FIG. 3, the power trunk opening system 1 utilizes the actuator 30 as a common component, so that the power transmitting mechanism of the hinge arm 10 which is embodied by the motor device 40 and the link device 50 of the actuator 30 can be embodied into different types, e.g., a hinge arm rotating type and a vehicle body rotating type.

For example, FIGS. 4 to 11 illustrate an example of the motor-integrated power trunk opening system 1 in which the actuator 30 is embodied by a hinge arm rotating structure, and FIGS. 12 to 17 illustrate an example of the motor-integrated power trunk opening system 1 in which the actuator 30 is embodied by a vehicle body rotating structure.

Detailed configuration of the motor-integrated power trunk opening system 1 using the hinge arm rotating structure of FIGS. 4 to 11 is as follows. Hereinbelow, the hinge bracket 11 refers to a guide hinge bracket 11-1, and the connection bracket 45-1 refers to a motor bracket 45.

Figure 4:
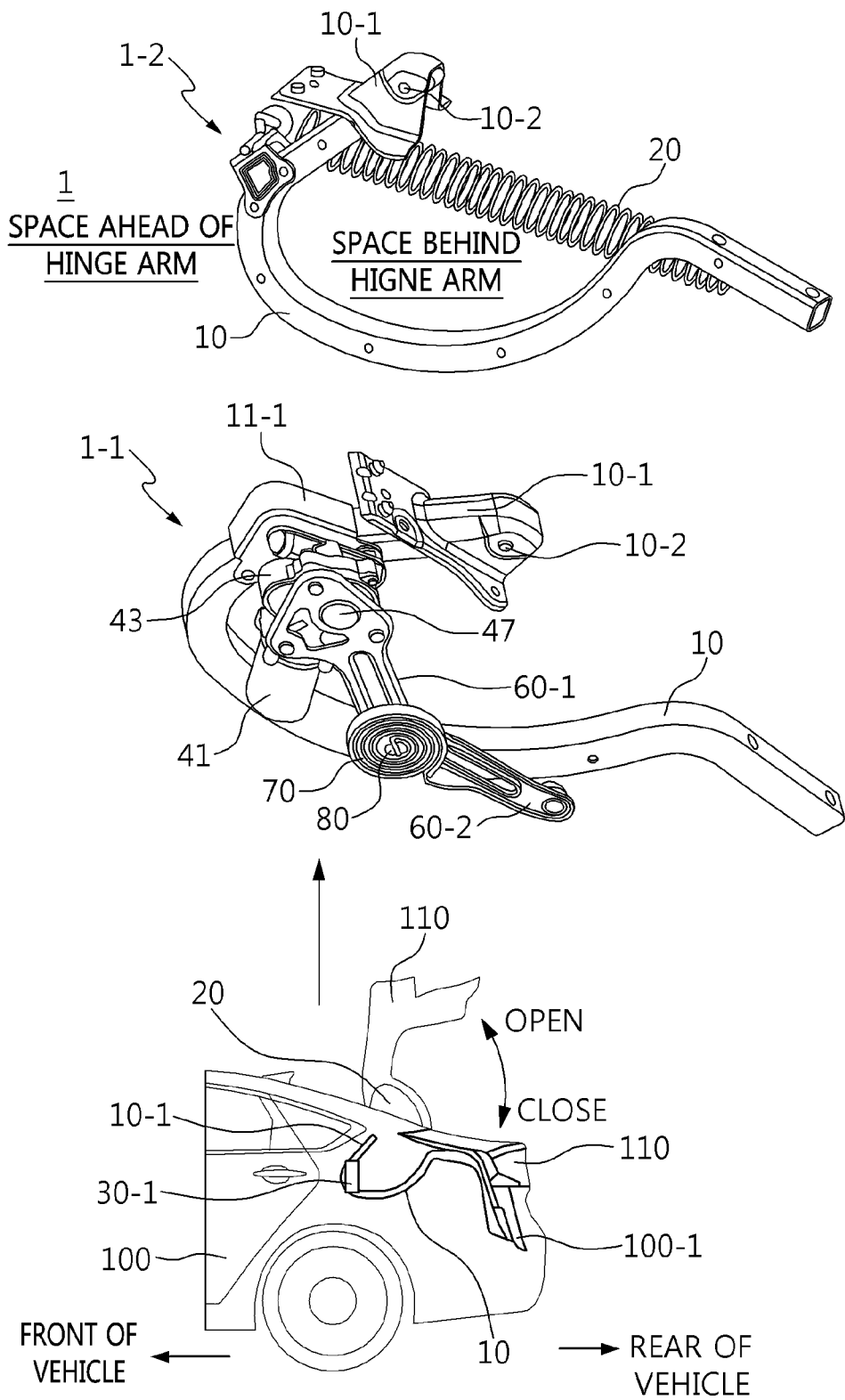
FIG. 4 is a view illustrating an example of a vehicle provided with a motor-integrated power trunk opening system having a hinge arm rotating structure, according to an exemplary embodiment of the present invention.

Referring to FIG. 4, there is illustrated an example in which the motor-integrated power trunk opening system 1 for opening/closing the trunk lid 110 of the trunk compartment 100-1 formed in the vehicle 100 has a hinge arm rotating structure.

More specifically, the motor-integrated power trunk opening system 1 is formed of a power mechanical device 1-1 and an interlocking mechanical device 1-2, and includes, as common elements, a pair of hinge arms 10 which are fixed to the vehicle body with an arm hinge pin 10-2 as the rotation center and coupled to the trunk lid 110 by a trunk bracket 10-1. The pair of hinge arms 10 are divided into a power-side hinge arm 10 and an interlocking-side hinge arm 10. If the power-side hinge arm 10 is disposed around one end portion of the trunk lid 110, the interlocking-side hinge arm 10 is disposed around the other end portion of the trunk lid 110. Therefore, the shape and the structure of the power-side hinge arm 10 and the interlocking-side hinge arm 10 are the same as those of a typical hinge arm for the trunk lid 110, but there is a difference between the power-side hinge arm 10 and the typical hinge arm in that the power-side hinge arm 10 further includes a guide hinge bracket 11-1 for connection with the power mechanical device 1-1.

For example, the power mechanical device 1-1 is formed of an actuator 30 configured to directly move the power-side hinge arm 10 coupled to the trunk lid 110 upward (the operation of opening the trunk lid). The actuator 30 may include a motor device 40 which directly applies, to the hinge arm 10, rotating force generated in a response to an operating signal, e.g., a signal generated by manipulating a switch, and a link device 50 which rotates along with the motor device 40 to make movement of the power-side hinge arm 10. On the other hand, the interlocking mechanical device 1-2 includes a mechanical side hinge arm 10 coupled to the trunk lid 110, and a tensile coil spring type or a compression coil spring type elastic member 20 configured to provide elastic restoring force to the hinge arm 10 when the mechanical side hinge arm 10 is moved downward (the operation of closing the trunk lid).

The power-side hinge arm 10, and a motor link 60-1 which is coupled with the motor 41 of the motor device 40 and a hinge arm link 60-2 of the link device 50, may form a hinge arm rotating structure, thus making it possible for the motor-integrated power trunk opening system 1 to operate in a hinge arm rotating manner. In the instant case, to form the hinge arm rotating structure, the motor device 40 and the link device 50 may be integrated or coupled with each other.

As a result, in terms of a layout, the hinge arm rotating type motor-integrated power trunk opening system 1 is formed such that the motor link 60-1 and the hinge arm link 60-2 that are coupled by a link shaft 80 are disposed on a side of the motor 41, a motor gear 43, and the motor bracket 45 and disposed in a space defined inside the hinge arm 10. Here, with regard to the orientation of the vehicle 100, when the side toward the engine compartment refers to the front of the vehicle, the side toward the trunk compartment 100-1 is defined as the rear of the vehicle. When the space inside the hinge arm 10 that faces the rear of the vehicle refers to a rear hinge arm space, and a space defined outside the hinge arm 10 that faces the front of the vehicle refers to a front hinge arm space.

Figure 5:
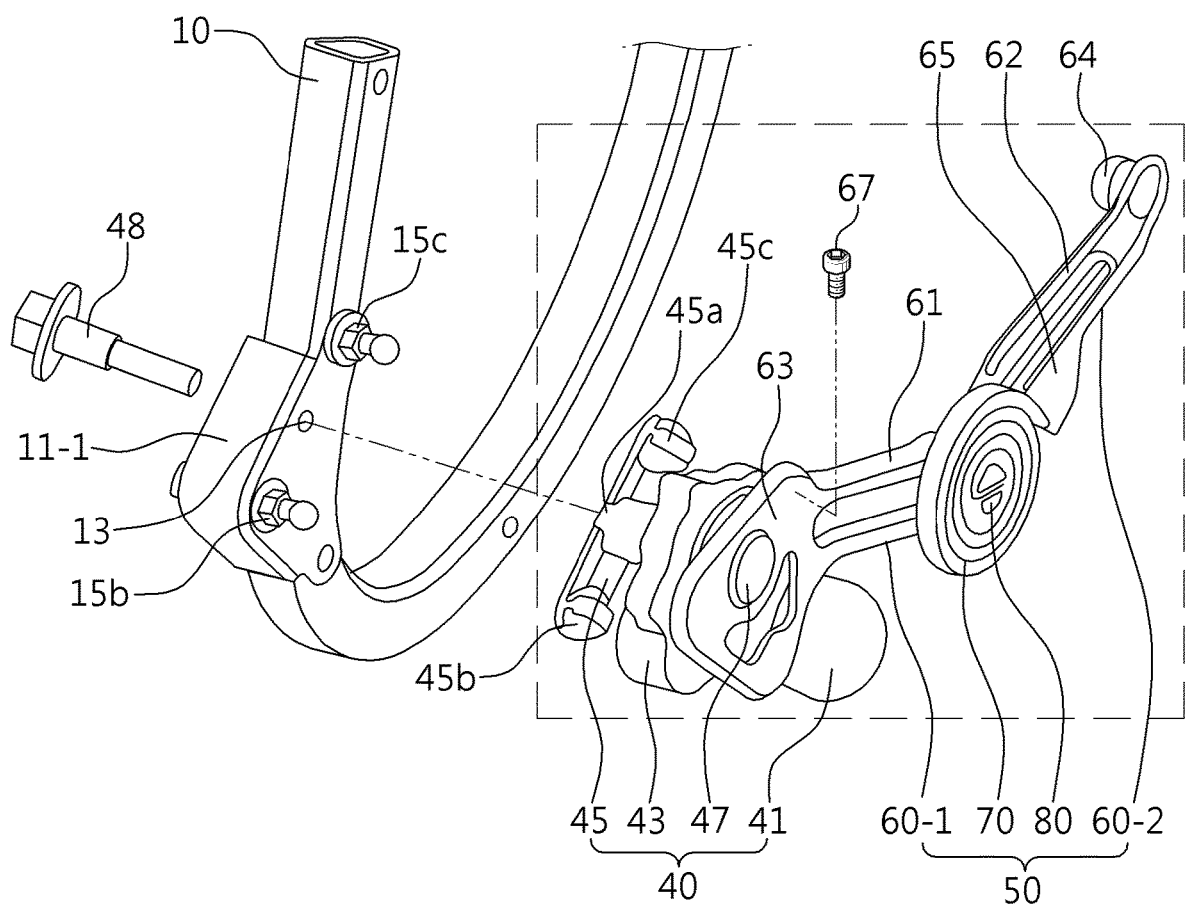
FIG. 5 is a view showing the configuration of a shaft fixing type actuator used in the motor-integrated power trunk opening system of FIG. 4.
Figure 6:
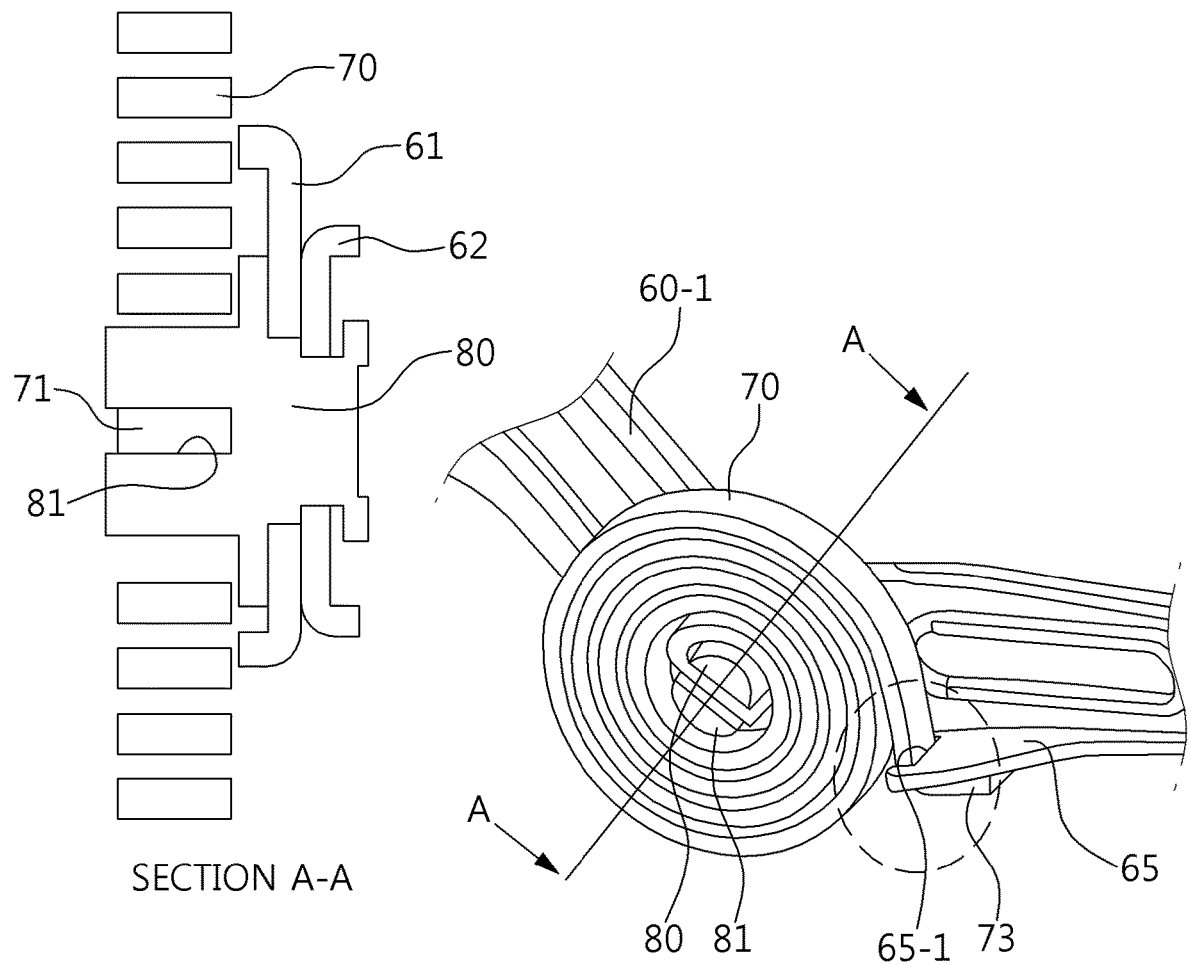
FIG. 6 is a view illustrating the configuration of a link device connected to the actuator of FIG. 5.

A hinge arm rotating method is classified into two kinds of methods for the power mechanical device 1-1. In a first hinge arm rotating method for the power mechanical device 1-1, the motor 41 of the motor device 40 is coupled by a shaft to be movable separately from the hinge arm 10 and is completely fixed to the motor link 60-1 of the link device 60 to be rotatable along with the motor link 60-1. Thus, when an angle between the hinge arm 10 and the motor 41 is changed by the rotation of the motor 41, rotational movement of the motor 41 and the motor link 60-1 is generated. This is illustrated in FIG. 5, FIG. 6 and FIG. 7. In the second hinge arm rotating method for the power mechanical device 1-1, the motor 41 is completely fixed to the hinge arm 10 to be movable along with the hinge arm 10, and the motor link 60-1 is fixed by a shaft to be movable separately from the motor 41. Thus, when the hinge arm 10 is rotated by the rotation of the motor 41, the angle between the motor 41 and the motor link 60-1 is changed. This is illustrated in FIGS. 8 to 9. Hereinbelow, the motor-side hinge arm 10 will be referred to as the hinge arm 10 for the sake of explanation.

Referring to the first hinge arm rotating method of FIG. 5 for the power mechanical device 1-1, the shaft fixing structure is formed such that, in an upper curved section of the hinge arm 10, a motor rotation shaft 48 inserted into a motor rotating hole 45a of the motor bracket 45 coupled to the motor gear 43 is connected to the motor gear 43 coupled with the motor 41. On the other hand, the completely fixing structure is formed such that, after the motor link 60-1 has been coupled to a gear shaft 47 of the motor gear 43, a bracket bolt 67 is threadedly coupled to a housing of the motor gear 43.

As a result, in the shaft fixing structure, when torque is outputted through the rotation of the motor gear 43 by the rotating force transmitted from the motor 41, an intersecting angle of the motor 41 relative to the hinge arm 10 changes, whereby the angle between the hinge arm 10 and the motor 41 is changed. On the other hand, the motor link 60-1 is completely fixed to the motor gear 43 and thus rotated along with the motor 41 through the gear shaft 47, thus making it possible for the motor line 60-1 and the hinge arm link 60-2 to be folded relative to the link shaft 80 such that the operation of the hinge arm 10 that moves upward due to a change in the intersecting angle can be prevented from being limited.

More specifically, a guide hinge bracket 11-1 having a triangular shape integrally protrudes from the upper curved section of the hinge arm 10, or is coupled thereto by welding or bolting to be separable. The guide hinge bracket 11-1 may include a pin passing hole 13 which is formed in a surface thereof which comes into close contact with the motor bracket 45 of the motor 41, and a pair of first and second guide pins 15b and 15c which protrude at positions distanced from each other by a predetermined distance. The motor rotation shaft 48 passes through the pin passing hole 13. The pair of first and second guide pins 15b and 15c are respectively inserted into first and second position holes 45b and 45c of the motor bracket 45, thus reinforcing the coupling of the motor bracket 45 to the hinge arm 10. Each of the pair of first and second guide pins 15b and 15c and the first and second position holes 45b and 45c may have a single body structure.

More specifically, the motor device 40 includes the motor 41, the motor gear 43 coupled to a motor housing of the motor 41, and the motor bracket 45 coupled with a gear housing of the motor gear 43. The motor 41 rotates in a clockwise direction or a counterclockwise direction in a response to an operating signal generated by manipulating a switch. The motor gear 43 operates the hinge arm 10 with a torque increased by reducing the speed of the rotating force of the motor using a plurality of gears engaging with a gear fixed on the motor shaft of the motor 41. The motor bracket 45 is formed integrally with the gear housing of the motor gear 43 and is brought into close contact with one side surface of the guide hinge bracket 11-1. The motor bracket 45 includes a motor rotating hole 45a and a pair of first and second position holes 45b and 45c. The motor rotation shaft 48 coming out of the pin passing hole 13 passes through the motor rotating hole 45a so that the hinge arm 10 and the motor 41 can be coupled to each other by a shaft. The pair of first and second guide pins 15b and 15c are respectively inserted into the pair of first and second position holes 45b and 45c to reinforce the coupling of the motor bracket 45 to the hinge arm 10. In the instant case, the motor rotation shaft 48 is disposed collinearly with the gear shaft 47 of the motor gear 43 coupled with the motor 41. The gear housing of the motor gear 43 (or the motor housing of the motor 41) functions as a medium coupled with the motor link 60-1 of the link device 50. The gear housing of the motor gear 43 (or the motor housing of the motor 41) may be integrally provided with a motor link body 61 of the motor link 60-1 or be coupled thereto by a bracket bolt 67.

More specifically, the link device 50 includes, as basic elements, the motor link 60-1, and the hinge arm link 60-2 coupled to the motor link 60-1. Furthermore, the link device 50 may include a link spring 70 which provides elastic restoring force to the motor link 60-1 and the hinge arm link 60-2 to generate restoring force using spring moment under actual mounting conditions, or an elastic member 20 which provides elastic restoring force to the hinge arm 10. This results from the structure in which the opening/closing moment $M_{motor}$ with which the motor of the motor device 40 lifts the trunk lid 110 is related to the opening moment $M_{spring}$ of the elastic member 20. Therefore, in the case where the opening/closing moment $M_{motor}$ is determined only by the restoring force of the elastic member 20, the link device 50 includes the motor link 60-1, the hinge arm link 60-2, and the link shaft 80. On the other hand, in the case where the opening/closing moment $M_{motor}$ is determined by the restoring force of the elastic member 20 and the restoring force of the link spring 70, the link device 50 includes the motor link 60-1, the hinge arm link 60-2, the link spring 70, and the link shaft 80.

The motor link 60-1 may include the motor link body 61 which is integrally provided with the gear housing of the motor gear 43 (or the motor housing of the motor 41) or be coupled thereto by the bracket bolt 67, and a hinge arm link body 63 which is coupled to the hinge arm link 60-2 by the link shaft 80. The hinge arm link 60-2 includes a motor coupling body 62 which is coupled to the hinge arm link body 63 of the motor link 60-1 by the link shaft 80, a vehicle coupling body 64 which is rotatably coupled to the vehicle body (an internal panel of the trunk compartment) by a shaft, and a spring flange 65 which is formed on one side surface of the motor coupling body 62 and supports the link spring 70.

The link spring 70 is formed of a spiral spring. One end portion of the link spring 70 is fixed to the link shaft 80, and the other end portion thereof is fixed to the spring flange 65 of the hinge arm link 60-2. Therefore, the motor link 60-1 and the link spring 70 are elastically compressed by rotational movement around the link shaft 80 when the motor 41 is operated to open the trunk lid 110, and are returned to their initial states when the trunk lid 110 is closed. In the instant case, the spring moment of the link spring 70 is configured to assist in the spring moment of the elastic member 20.

The link shaft 80 fixes one end portion of the link spring 70 in a place while coupling the hinge arm link body 63 and the motor coupling body 62 to each other such that the motor link 60-1 and the hinge arm link 60-2 are integrated with each other.

Referring to FIG. 6, the hinge arm link 6-2 has a spring stopper 65-1 formed by cutting out a portion of the spring flange 65 provided on one side surface of the motor coupling body 62. The link spring 70 which is formed of a spiral spring includes a pin end portion 71 formed at the internal side of the link spring 70 to form one end portion thereof, and a link end portion 73 formed at an external side of the link spring 70 to form the other end portion thereof. The link shaft 80 has a spring slit 81 formed in an extension shaft portion which integrally extends from a shaft portion that couples overlapped portions of the motor link body 61 and the motor coupling body 62 of the motor link 60-1 and the hinge arm link 60-2.

Therefore, in the link spring 70, the pin end portion 71 is inserted into and locked to the spring slit 81 and thus fixed to the link shaft 80, and the link end portion 73 is locked to the spring stopper 65-1 of the spring flange 65 and thus fixed to the hinge arm link 60-2. As a result, the link spring 70 is elastically compressed by the rotational movement of the motor link 60-1 and the hinge arm link 60-2 around the link shaft 80 when the motor 41 is operated to open the trunk lid 110. When the trunk lid 110 is closed, the link spring 70 returns to its initial state, thus making the returning operation of the motor link 60-1 and the hinge arm link 60-2 smooth.

Figure 7A:
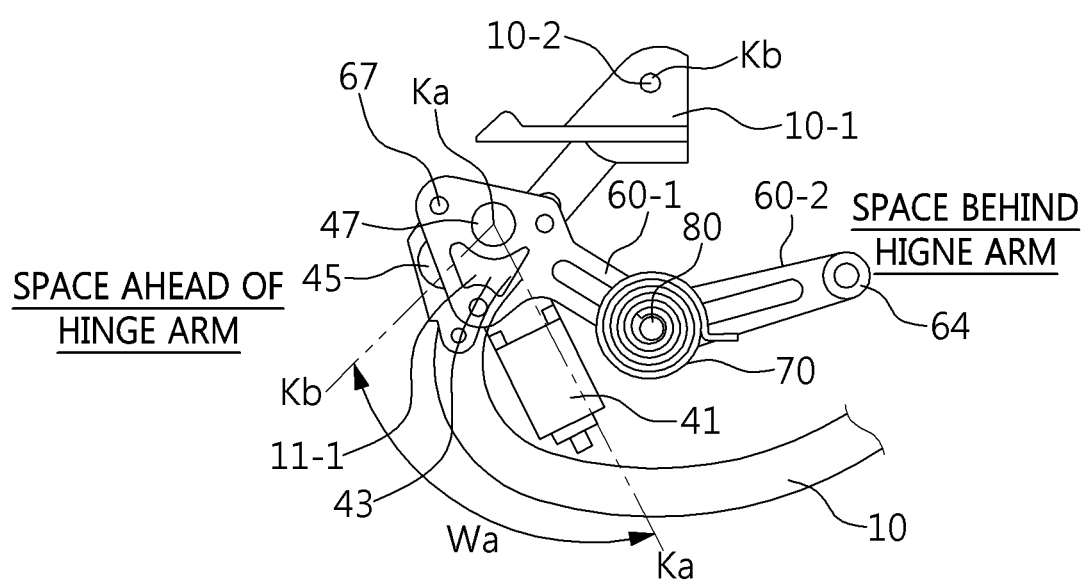
FIG. 7A, FIG. 7B and FIG. 7C are a view illustrating the operation of the motor-integrated power trunk opening system using the shaft fixing type actuator of FIG. 5.
Figure 7B:
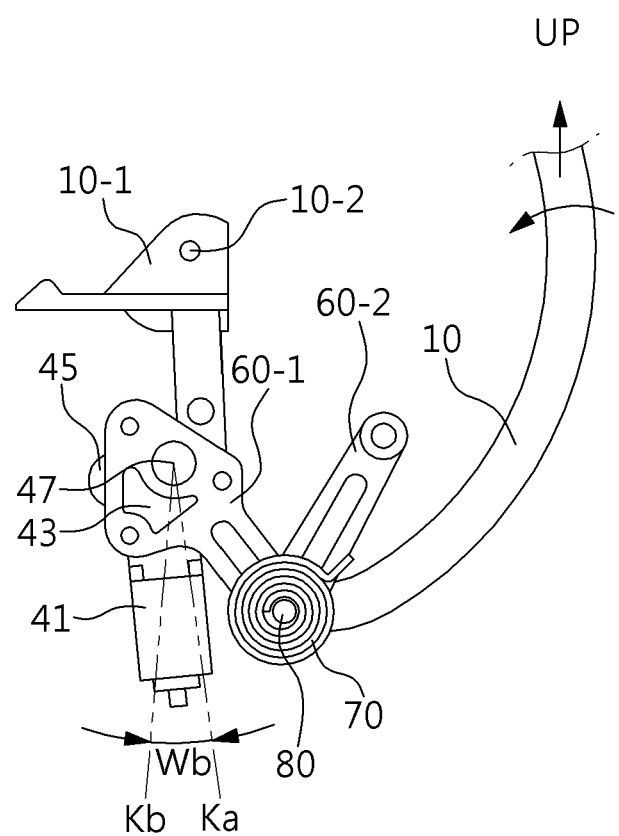
Figure 7C:
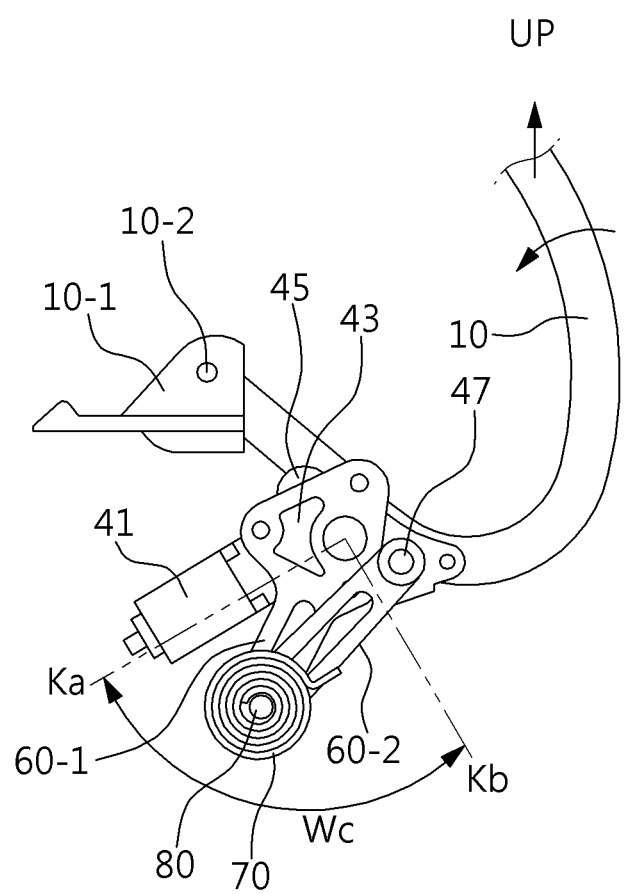
Figure 8:
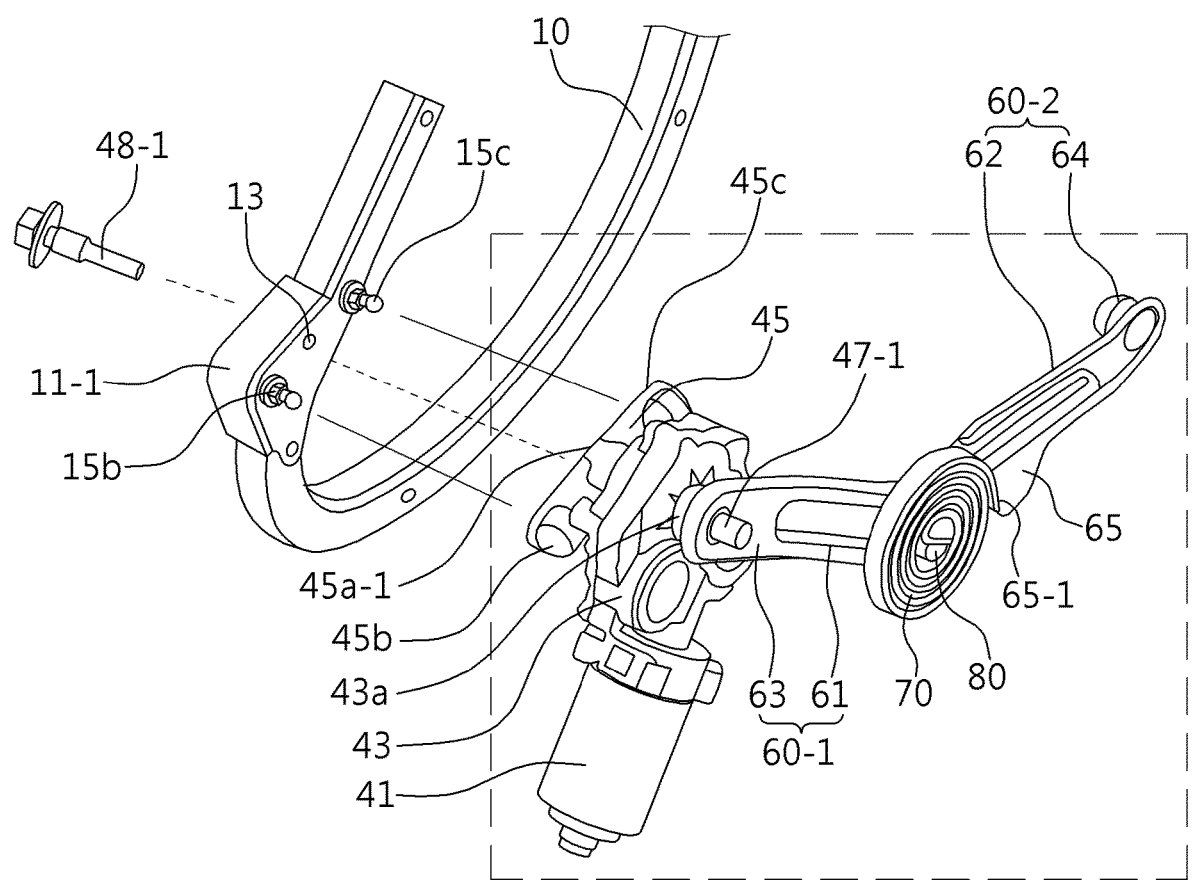
FIG. 8 is a view showing the configuration of a motor fixing type actuator used in the motor-integrated power trunk opening system of FIG. 4.

FIGS. 7(A), 7(B) and 7(C) illustrate a process of opening the trunk lid 110 by the operation of the motor-integrated power trunk opening system 1 to which the first hinge arm rotating method is applied. In the instant case, because the interlocking mechanical device 1-2 follows the movement of the trunk lid 110, the operation of only the power mechanical device 1-1 which is operated by the power of the motor 41 will be described. Furthermore, the rotating center of the power mechanical device 1-1 is formed by the shaft fixing structure of the motor rotation shaft 48 and the motor gear 43 which is covered with the gear shaft 47 of the motor gear 43 because it is disposed collinearly with the gear shaft 47. Therefore, the term "rotating center" of the gear shaft 47 means the motor rotation shaft 48. The rear of the hinge arm means a space behind the hinge arm. The front of the hinge arm means a space ahead of the hinge arm.

Referring to the closed state of FIG. 7(A), in the closed state of the trunk lid 110, because the hinge arm 10 is in a state in which it has moved downward around the arm hinge pin 10-2, an imaginary motor rotation shaft line Ka-Ka connecting the motor 41 and the gear shaft 47 (i.e., the motor rotation shaft 48 covered with the gear shaft 47) forms an initial intersection angle Wa as an acute angle with respect to an imaginary hinge arm line Kb-Kb connecting the gear shaft 47 and the arm hinge pin 10-2. Therefore, the initial intersection angle Wa corresponds to the initial state of the motor 41 relative to the hinge arm 10 in a state in which the motor rotation shaft line Ka-Ka is disposed ahead of the hinge arm line Kb-Kb. In the instant case, the motor 41 is disposed behind the rear of the heat arm 10.

As a result, the motor 41 is disposed in the space inside the hinge arm 10. The motor link 60-1 and the hinge arm link 60-2 are maintained in a state in which they are deployed at the maximum deployed angle (e.g., greater than 90° and less than 180°) on the link shaft 80 even when the elastic force of the link spring 70 compressed to the maximum is applied to the motor link 60-1 and the hinge arm link 60-2. In the present state, the link spring 70 forms the maximum compression deformed state by the unfolding of the motor link 60-1 and the hinge arm link 60-2, so that the link spring moment against the weight of the trunk lid 110 is accumulated. Furthermore, the elastic member 20 of the interlocking mechanical device 1-2 forms the maximum compression deformed state to its initial position, so that the elastic member spring moment against the weight of the trunk lid 110 is accumulated.

Referring to the opening operation state of FIG. 7(B), the motor 41 is operated in a response to an operating signal generated by manipulating the control switch, so that the motor gear 43 rotates with the motor rotation shaft 48 as the rotating center using torque (e.g., clockwise rotating force) corresponding to the rotating direction of the motor 41 and thus applies force to the motor link 60-1. As such, the motor link 60-1 coupled by the link shaft 80 to the hinge arm link 60-2 mounted to the vehicle body is rotated by the torque of the motor gear 43 in the clockwise direction on the link shaft 80 and thus folded onto the hinge arm link 60-2. The folding of the motor link 60-1 onto the hinge arm link 60-2 makes the motor 41 and the motor gear 43 rotate freely relative to the motor rotation shaft 48 and simultaneously makes the hinge arm 10 move upward relative to the hinge pin 10-2. In the instant case, the motor 41 is disposed ahead of the front of the hinge arm 10.

As a result, the angle of the motor 41 relative to the hinge arm 10 is reduced by the free rotation of the motor 41 and the upward movement of the hinge arm 10, so that the initial intersection angle Wa is changed to an operating intersection angle Wb which is less than the initial intersection angle Wa. Furthermore, the link spring 70 generates elastic compressive force using elastic deformation resulting from the folding of the motor link 60-1 and the hinge arm link 60-2. When the link spring 70 that has been in the maximum compression deformed state by the unfolding of the motor link 60-1 and the hinge arm link 60-2 is released from the compression deformed state, the link spring 70 provides the elastic force, thus generating the link spring moment against the weight of the trunk lid 110. The elastic member 20 of the interlocking mechanical device 1-2 generates an elastic member spring moment against the weight of the trunk lid 110 by opening of the trunk lid 110 resulting from upward movement of the hinge arm 10.

Referring to the open state of FIG. 7(C), the operation of the motor 41 is stopped when the hinge arm 10 is moved upward to the uppermost position so that the trunk lid 110 completely opens. In the instant case, the motor 41 is disposed ahead of the front of the hinge arm 10.

As a result, the motor link 60-1 and the hinge arm link 60-2 are folded to the maximum onto each other around the link shaft 80. Thus, the link spring 70 is completely loosened so that the spring moment is not applied to the motor link 60-1 and the hinge arm link 60-2, and the elastic member 20 of the interlocking mechanical device 1-2 is expanded to the maximum by the completely upwardly moved hinge arm 10. Accordingly, the elastic member spring moment against the weight of the trunk lid 110 is not generated. With regard to the angle of the motor 41 relative to the hinge arm 10, an opening intersection angle We is formed by the maximum folding of the motor link 60-1 and the hinge arm link 60-2 along with the maximum upward movement of the hinge arm 10, so that the motor rotation shaft line Ka-Ka is disposed behind the hinge arm line Kb-Kb.

Therefore, the opening of the trunk lid 110 makes the trunk compartment 100-1 of the vehicle 100 open, as shown in FIG. 3.

FIG. 8 illustrates the second hinge arm rotating method for the power mechanical device 1-1. The second hinge arm rotating method is embodied by the same components as that of the first hinge arm rotating method, with only a difference in that the positions of the shaft coupling structure and the completely fixing structure of the second hinge arm rotating method are opposite to those of the first hinge arm rotating method.

That is, the shaft fixing structure is formed by coupling the motor link 60-1 with a gear fixing shaft 47-1 of the motor gear 43 coupled with the motor 41, but the completely fixing structure is formed by the motor gear 43 which is inserted into a motor fixing hole 45a-1 of the motor bracket 45 coupled with the motor gear 43 and is coupled with the motor 41. In the instant case, the gear fixing shaft 47-1 has a rectangular cross-section passing through a hole of the motor link 60-1 and is coupled with a motor gear shaft hole boss 43a of the motor gear 43, thus forming a shaft fixing state with the motor link 60-1. The motor fixing haft 48-1 has an external thread on an external circumferential surface thereof and is threadedly coupled with the motor fixing hole 45a-1 having an internal thread on an internal circumferential surface thereof, thus forming a completely fixing state with the motor gear 43.

Consequently, because the motor gear 43 coupled with the motor 41 and the hinge arm 10 form the completely fixing structure, when the motor 41 rotates, the hinge arm 10 and the motor 41 rotate together so that the intersection angle between the motor 41 and the hinge arm 10 is maintained constant without being changed. On the other hand, because the motor link 60-1 has a shaft fixing structure in which it is fixed to the gear fixing shaft 47-1 of the motor gear 43, when the motor 41 rotates, the motor link 60-1 is rotated relative to the motor 41.

Figure 9A:
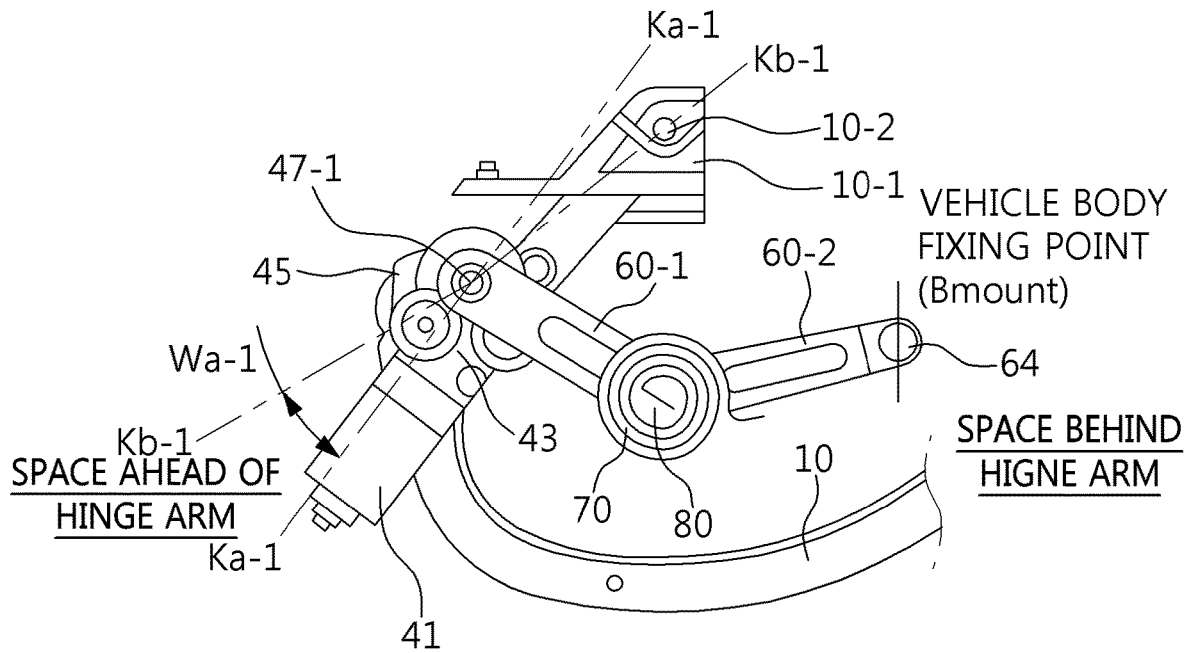
FIG. 9A, FIG. 9B and FIG. 9C are a view illustrating the operation of the motor-integrated power trunk opening system using the motor fixing type actuator of FIG. 8.
Figure 9B:
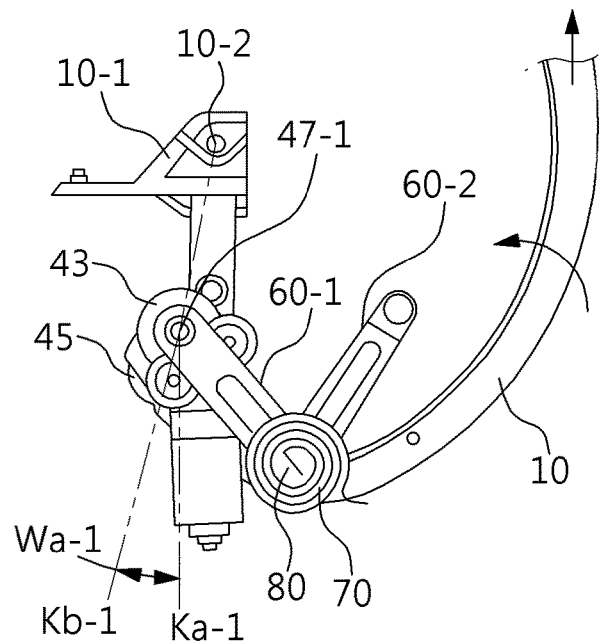
Figure 9C:
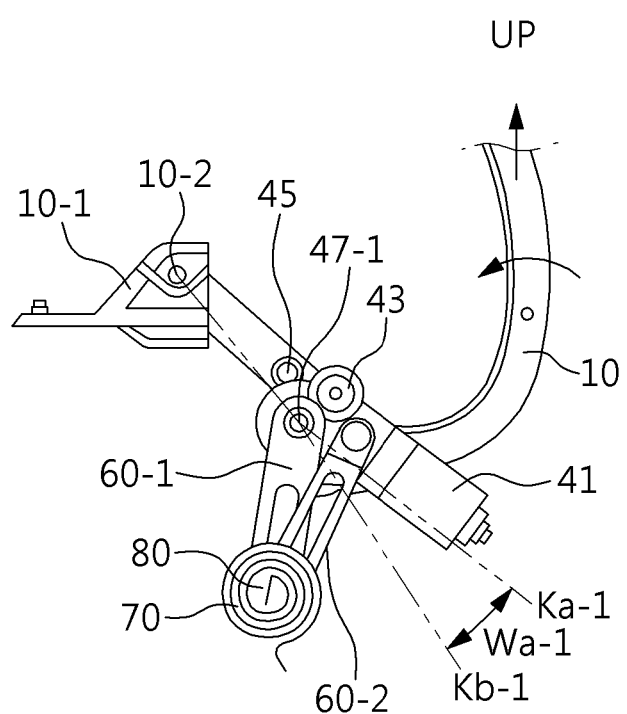

FIGS. 9(A), 9(B) and 9(C) illustrate a process of opening the trunk lid 110 by the operation of the motor-integrated power trunk opening system 1 to which the second hinge arm rotating method is applied. In the instant case, the closed state of FIG. 9(A), the opening operation state of FIG. 9(B), and the open state of FIG. 9(C) are respectively the same as the closed state of FIG. 7(A), the opening operation state of FIG. 7(B), and the open state of FIG. 7(C).

However, with regard to the closed state of the trunk lid 110, there is only a difference in that an initial intersection angle Wa-1 of an acute angle formed between the motor rotation shaft line Ka-Ka and the hinge arm line Kb-Kb of the closed state of FIG. 9(A) is less than that of the initial intersection angle Wa formed in FIG. 7(A). Furthermore, in the open state of the trunk lid 110 that has passed through the opening operation, when a folding angle of the motor link 60-1 and the hinge arm link 60-2 is changed, as shown in the opening operation state of FIG. 9(B) and the open state of FIG. 9(C), the initialization intersection angle Wa-1 of the hinge arm 10 and the motor 41 is maintained constant without changing. This results from the structure in which the motor 41 has been completely fixed to the hinge arm 10.

Figure 10:
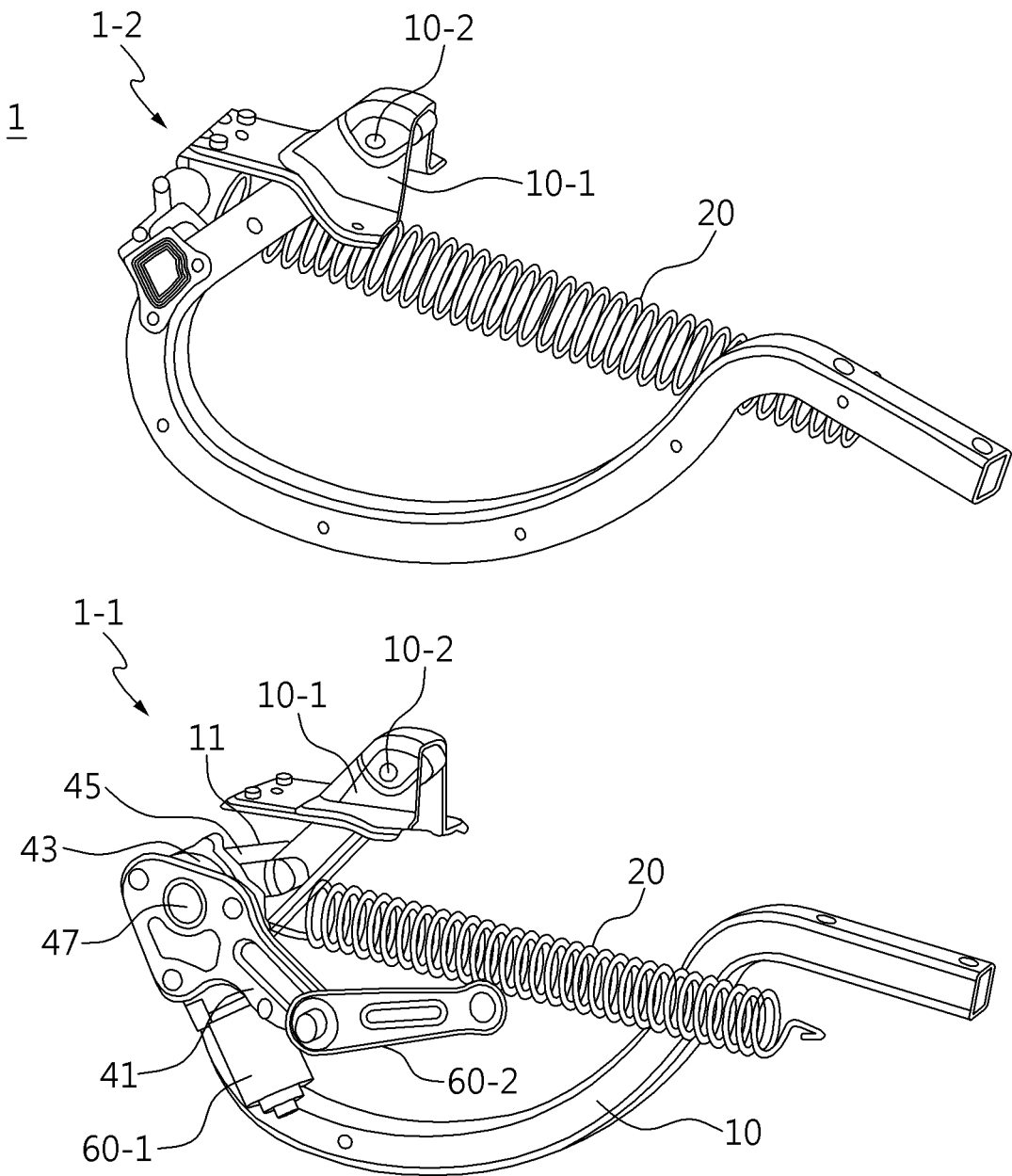
FIG. 10 is a view showing an example of an elastic member used in each of a power mechanical device and an interlocking mechanical device used in a vehicle provided with the motor-integrated power trunk opening system having the hinge arm rotating structure of FIG. 4.

Referring to FIG. 10, there is illustrated an example in which the hinge arm rotating type motor-integrated power trunk opening system 1 of FIG. 4 is formed of the power mechanical device 1-1 and the interlocking mechanical device 1-2 which use the elastic member 20 in common.

In the instant case, the power side elastic member 20 applied to the power mechanical device 1-1 and the interlocking side elastic member 20 applied to the interlocking mechanical device 1-2 are formed of the same coil spring, but there is a difference therebetween in that, unlike the interlocking side elastic member 20, the spring moment of the power side elastic member 20 is provided in the same manner as that of the link spring moment of the link spring 70. Furthermore, each of the power side elastic member 20 and the interlocking side elastic member 20 is fixed to a vehicle body panel using a vehicle body fixing end portion, but there is a difference in a fixing structure of an arm fixing end portion 20-1 which is formed opposite to the vehicle body fixing end portion.

Figure 11:
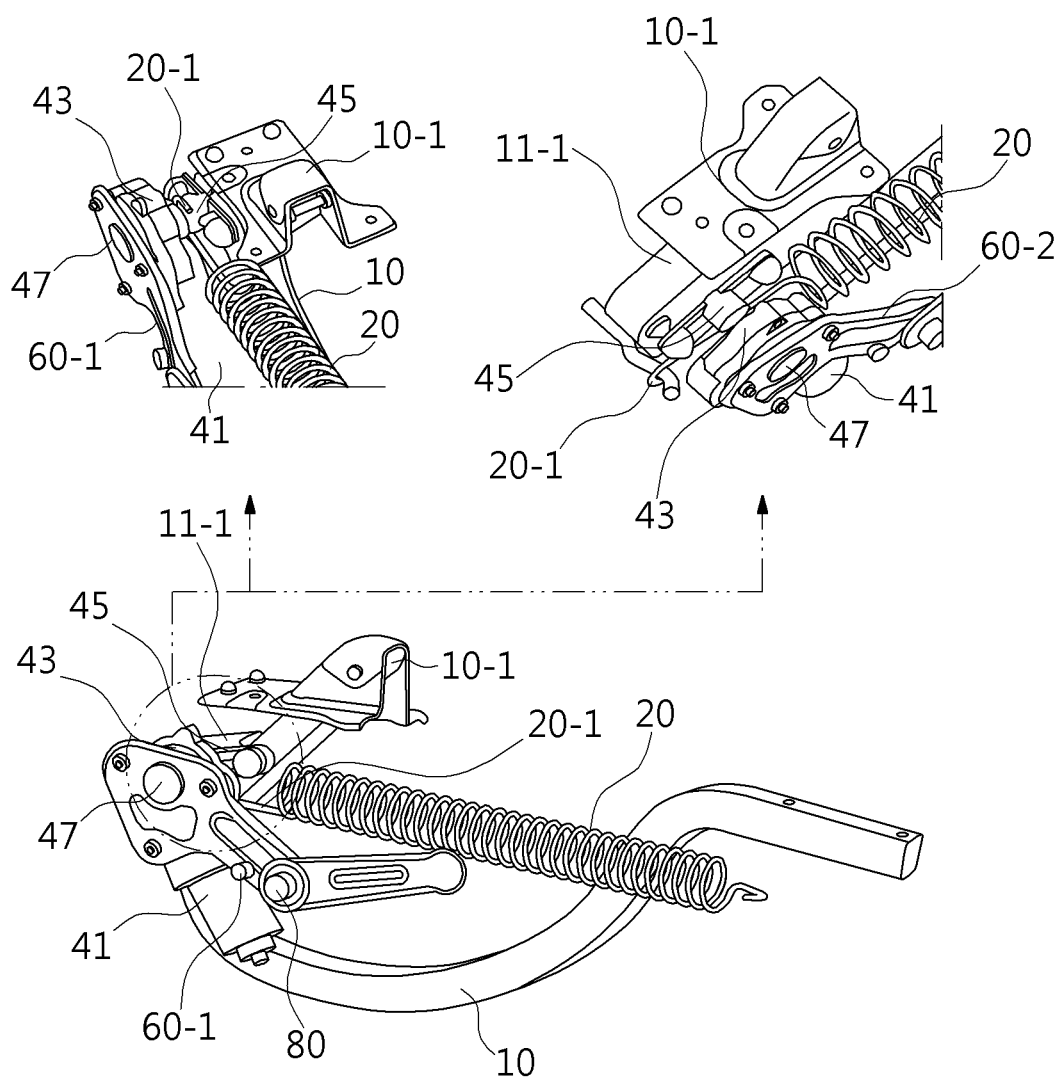
FIG. 11 is a view illustrating a coupling structure of an elastic member used in the power mechanical device of FIG. 10.

Referring to FIG. 11, the arm fixing end portion of the interlocking side elastic member 20 is locked to a trunk lid hinge bar 90, and the arm fixing end portion 20-1 of the power side elastic member 20 is locked to the motor bracket 45 or a trunk lid hinge bar 90 which provides elastic repulsive force to the trunk lid 110.

Figure 15A:
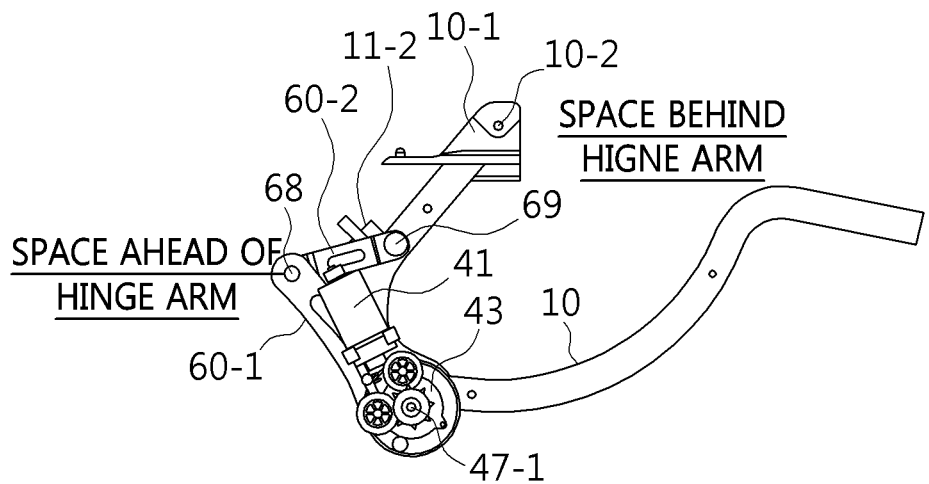
FIG. 15A, FIG. 15B and FIG. 15C are a view illustrating the operation of the motor-integrated power trunk opening system using the gear shaft fixing type actuator of FIG. 14.
Figure 15B:
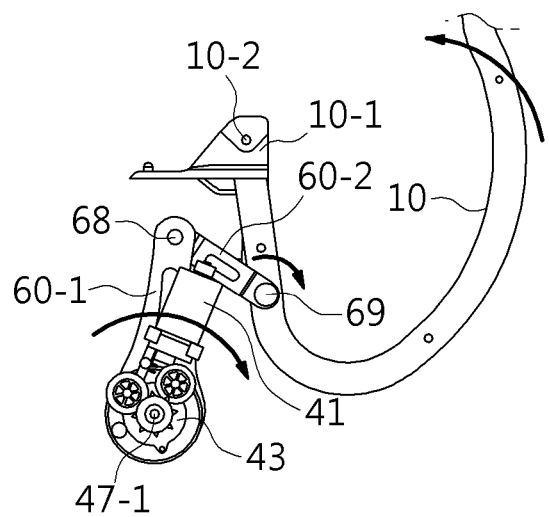
Figure 15C:
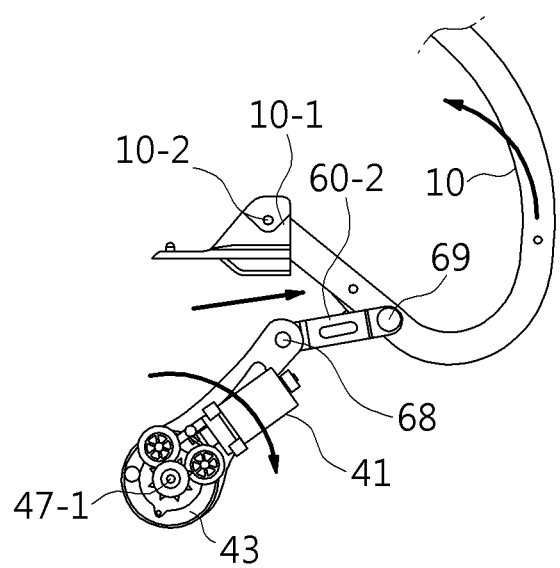
Figure 16:
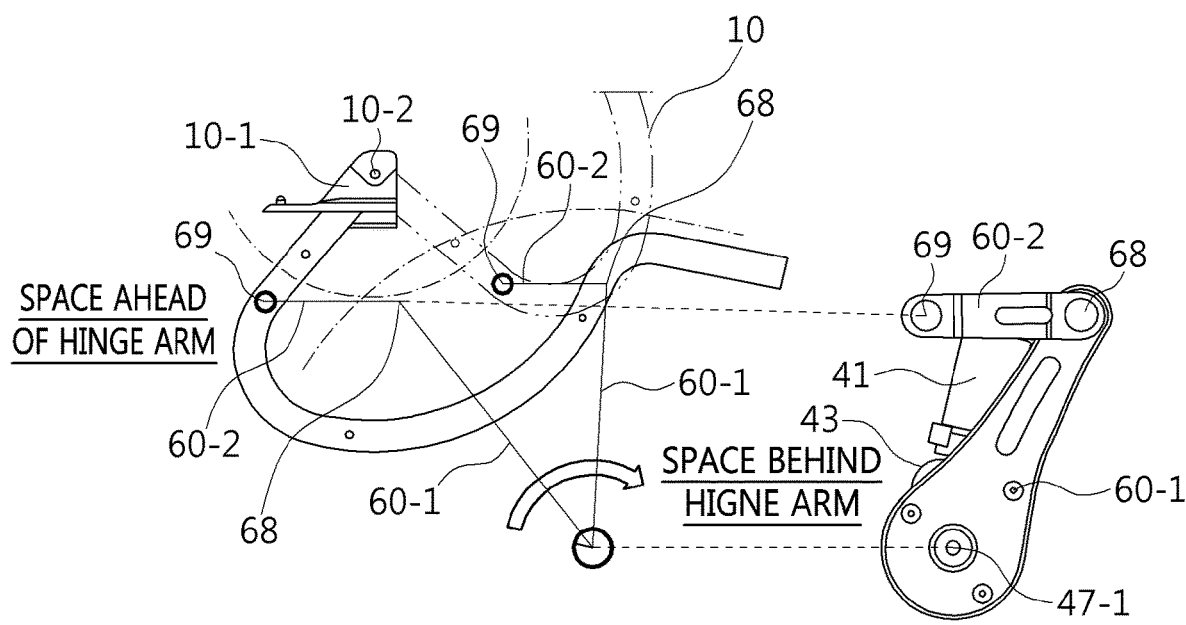
FIG. 16 is a view showing a modification of the layout of the gear shaft fixing type actuator used in the motor-integrated power trunk opening system of FIG. 12.

Detailed configuration of the vehicle body rotating type motor-integrated power trunk opening system 1 of FIGS. 12 to 17 is as follows. Hereinafter, the hinge bracket 11 will be referred to as a fixing hinge bracket 11-2, and the connection bracket 45-1 will be referred to as a motor bracket 45. In the instant case, the vehicle body rotating type motor-integrated power trunk opening system 1 is operated such that, as shown in FIGS. 12 to 15, the trunk lid 110 is opened by pushing out the hinge arm 10 or, as shown in FIG. 16, the trunk lid 110 is opened by pulling the hinge arm 10.

Referring to FIG. 12, there is illustrated an example in which the motor-integrated power trunk opening system 1 for opening or closing the trunk lid 110 of the trunk compartment 100-1 formed in the vehicle 100 has a vehicle body rotating structure.

More specifically, the motor-integrated power trunk opening system 1 is formed of a power mechanical device 1-1 and an interlocking mechanical device 1-2. The power mechanical device 1-1 includes a power side hinge arm 10, a trunk bracket 10-1, an arm hinge pin 10-2, a fixing hinge bracket 11-2, a motor 41, a motor gear 43, a joint bracket 49, a motor link 60-1, a hinge arm link 60-2, a link hinge pin 68, a link ball joint 69, and a link spring 70 or a power side elastic member 20. The interlocking mechanical device 1-2 includes an interlocking side hinge arm 10, a trunk bracket 10-1, an arm hinge pin 10-2, and an interlocking elastic member 20.

The vehicle body rotating type motor-integrated power trunk opening system 1 has components similar to those of the hinge arm rotating type motor-integrated power trunk opening system 1 of FIGS. 4 to 11, but differs therefrom in that the fixing hinge bracket 11-2 is used in lieu of the guide hinge bracket 11-1, the link hinge pin 68 is used in lieu of the link shaft 80, and the joint bracket 499 and the link ball joint 69 are used as additional components instead of removing the motor bracket 45 and the link shaft 80.

The motor link 60-1 is disposed such that it overlaps the motor 41 in a longitudinal direction of the motor gear 43 in a state in which it is fixed to a gear shaft of the motor gear 43 coupled with the motor 41. One end portion of the hinge arm link 60-2 is coupled, by the link hinge pin 68, with a free end portion of the motor link 60-1 which is not fixed to the motor gear 43, and the other end portion thereof is hinged to the fixing hinge bracket 11-2 by the link ball joint 69. Unlike the hinge arm rotating type motor-integrated power trunk opening system 1, the hinge arm link 60-2 is directly fixed to the hinge arm 10 rather than being fixed to the vehicle body. The hinge arm link 60-2 has a smooth curved structure or linear structure (refer to FIG. 14).

As a result, in terms of a layout, the vehicle body rotating type motor-integrated power trunk opening system 1 is formed such that the motor link 60-1 and the hinge arm link 60-2 that are coupled by the link hinge pin 68 has a bent structure (a perpendicular structure having an acute angle) and is disposed in space defined outside the hinge arm 10, and the motor 41 and the motor gear 43 are disposed to overlap the motor link 60-1. Here, with regard to the orientation of the vehicle 100, when the side toward the engine compartment refers to the front of the vehicle, the side toward the trunk compartment 100-1 is defined as the rear of the vehicle. When the space inside the hinge arm 10 that faces the rear of the vehicle refers to a rear hinge arm space, and a space defined outside the hinge arm 10 that faces the front of the vehicle refers to a front hinge arm space.

Figure 13:
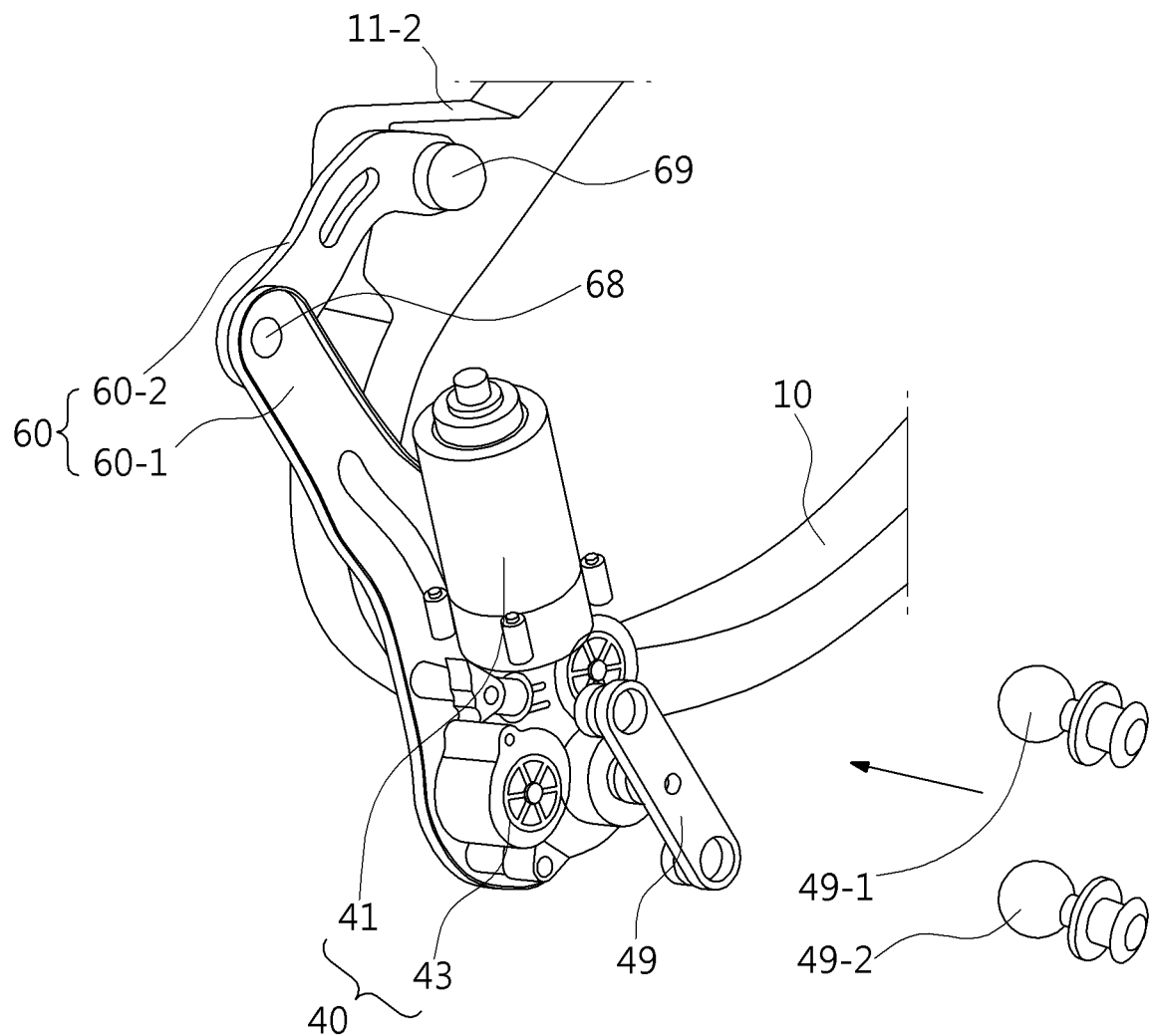
FIG. 13 is a view showing the configuration of a ball joint fixing type actuator used in the motor-integrated power trunk opening system of FIG. 12.

Referring to FIG. 13, it can be understood that a vehicle body shaft fixing structure of the motor 41 may be embodied as a two-point fixing structure using the joint bracket 49. As shown in the drawing, the vehicle body shaft fixing structure of the motor 41 is formed of the joint bracket 49 and a pair of first and second vehicle body ball joints 49-1 and 49-2. The joint bracket 49 has a linear bar shape with joint holes formed in respective opposite end portions thereof and is fixed to the gear housing of the motor gear 43. Each of the pair of first and second vehicle body ball joints 49-1 and 49-2 is formed of a ball which is inserted, along with a coupler fixed to the vehicle body panel of the trunk compartment 100-1, into the corresponding joint hole, thus making it possible for the joint bracket 49 to rotate freely.

As a result, the shaft fixing structure is formed such that the joint bracket 49 fixed to the motor gear 43 is coupled with the first and second vehicle body ball joints 49-1 and 49-2 to allow the motor gear 43 to rotate relative to the vehicle body panel. The completely fixing structure is formed such that the link ball joint 69 couples the hinge arm link 60-2 with the hinge arm 10 so that the hinge arm 10 is pushed out and moved upward by the rotating force of the motor gear 43. Therefore, the operation of the motor 41 makes the motor 41, the motor gear 43, and the motor link 60-1 rotate around the first and second ball joints 49-1 and 49-2. The rotation of the motor link 60-1 makes the hinge arm link 60-2 be pushed out, thus moving the hinge arm 10 upward.

Figure 14:
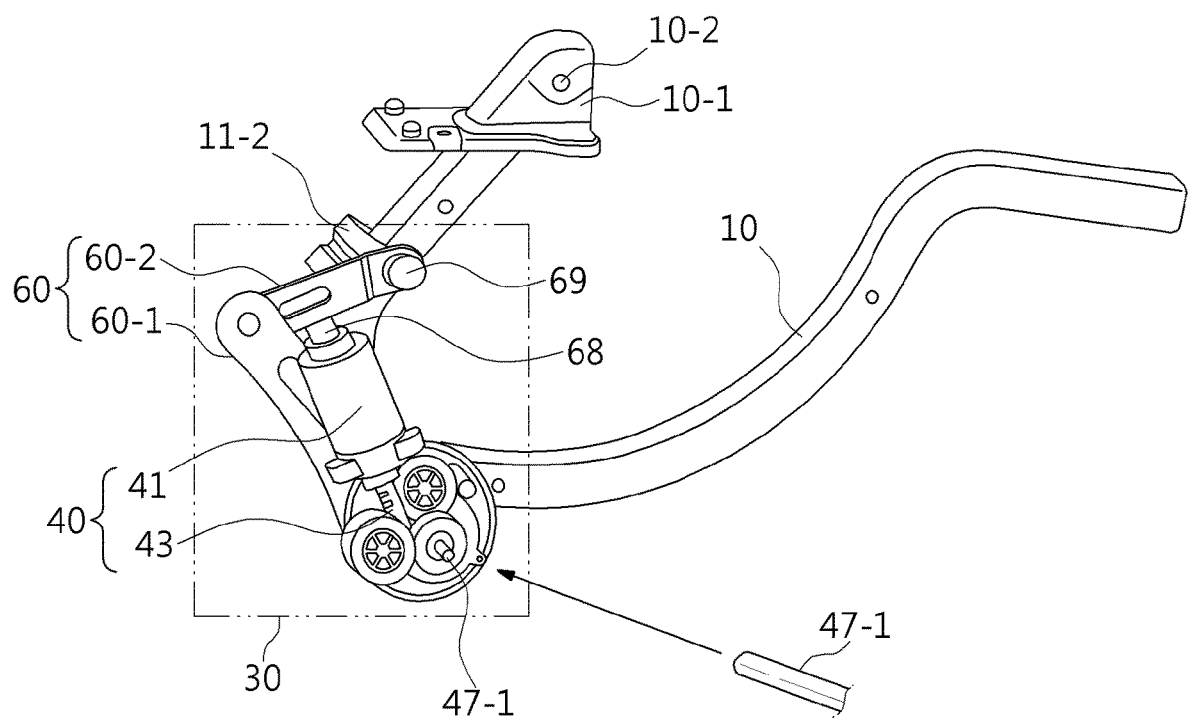
FIG. 14 is a view showing the configuration of a gear shaft fixing type actuator used in the motor-integrated power trunk opening system of FIG. 12.

Referring to FIG. 14, it can be understood that the vehicle body shaft fixing structure of the motor 41 may be embodied as a one-point fixing structure using the gear fixing shaft 47-1 in lieu of the joint bracket 49. As shown in the drawing, the vehicle body shaft fixing structure of the motor 41 is formed by fixing one end portion of the rectangular cross-sectional gear fixing shaft 47-1 using the vehicle body panel, and fixing the other end portion thereof using the rotation shaft of the motor gear 43.

As a result, the shaft fixing structure is formed by coupling the gear fixing shaft 47-1 fixed at one end portion thereof to the vehicle body panel to the rotation shaft of the motor gear 43 such that the motor gear 43 rotates relative to the vehicle body panel. On the other hand, the completely fixing structure is formed by fixing the hinge arm link 60-2 and the hinge arm 10 using the link ball joint 69 such that the hinge arm 10 is pushed out and moved upward by the rotating force of the motor gear 43.

Therefore, the operation of the motor 41 makes the motor 41, the motor gear 43, and the motor link 60-1 rotate around the gear fixing shaft 47-1. The rotation of the motor link 60-1 makes the hinge arm link 60-2 be pushed out, thus moving the hinge arm 10 upward.

A closed state of FIG. 15(A), an opening operation state of FIG. 15(B), and an open state of FIG. 15(C) show a process in which the vehicle body rotating type motor-integrated power trunk opening system 1 pushes out the hinge arm 10 and thus opens the trunk lid 110.

Referring to the closed state of FIG. 15(A), in the close state of the trunk lid 110, the hinge arm 10 is in a state in which it has moved downward around the arm hinge pin 10-2, so that the motor link 60-1 and the hinge arm link 60-2 that are coupled to each other form an initial sate in which they are pushed backward to the maximum behind the rear of the hinge arm 10. In the instant case, the motor 41 is disposed ahead of the front of the hinge arm 10.

Referring to the opening operation state of FIG. 15(B), the motor (41) is operated in a response to an operating signal generated by manipulating the control switch so that the motor gear 43 generates torque (e.g., clockwise rotating force) corresponding to the rotating direction of the motor 41. As such, the motor 41 and the motor gear 43 are rotated around the gear fixing shaft 47-1 (or around the joint bracket 49 and the pair of first and second vehicle body ball joints 49-1 and 49-2), thus applying torque to the motor link 60-1. As a result, the motor link 60-1 is rotated, pushing the hinge arm link 60-2 coupled thereto by the link hinge pin 68. The force with which the hinge arm link 60-2 is pushed is transmitted to the hinge arm 10, whereby the hinge arm 10 is moved upward. During the present process, the link spring 70 generates a link spring moment against the weight of the trunk lid 110 and, simultaneously, the elastic member 20 of the interlocking mechanical device 1-2 generates an elastic member spring moment against the weight of the trunk lid 110. In the instant case, the motor 41 is disposed ahead of the front of the hinge arm 10.

Referring to the open state of FIG. 15(C), while the motor 41 is continuously operated, the motor link 60-1 is further moved upward, and the distance that the hinge arm link 60-2 is pushed is increased, whereby the hinge arm 10 is moved upward to the uppermost position so that the trunk lid 110 completely opens. The operation of the motor 41 is stopped when the hinge arm 10 reaches the maximally upwardly moved position. In the instant case, the motor 41 is disposed ahead of the front of the hinge arm 10.

Therefore, the opening of the trunk lid 110 makes the trunk compartment 100-1 of the vehicle 100 open, as shown in FIG. 11.

On the other hand, FIG. 16 illustrates a state in which the vehicle body rotating type motor-integrated power trunk opening system 1 opens the trunk lid 110 by pulling the hinge arm 10. In the instant case, the operation of the hinge arm 10 that opens the trunk lid 110 is the same as that of the pushing method of FIG. 15A, FIG. 15B and FIG. 15C but unlike the pushing method in which the hinge arm link 60-2 is disposed outside the hinge arm 10, the hinge arm link 60-2 is disposed inside the hinge arm 10. Therefore, all operation processes of the opening operation state of FIG. 15(B) are same as that of the pushing method, but there is only a difference in that the motor link 60-1 pulls the hinge arm link 60-2 to move it upward. The links 60-1 and 60-2, along with the motor 41, are disposed behind the rear of the hinge arm 10.

Figure 17:
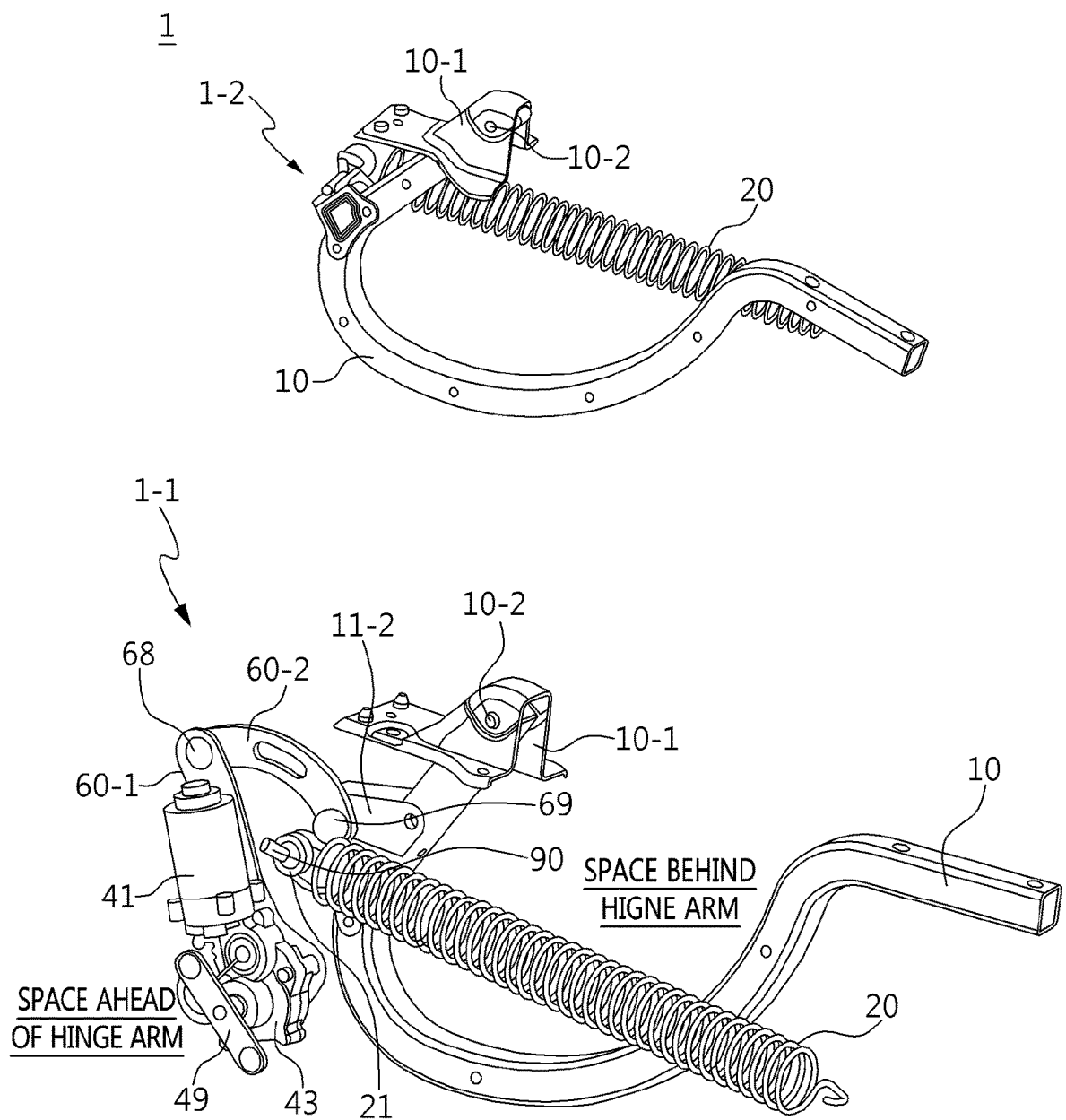
FIG. 17 is a view showing an example of an elastic member used in each of a power mechanical device and an interlocking mechanical device used in a vehicle provided with the motor-integrated power trunk opening system having the vehicle body rotating structure of FIG. 12.

Referring to FIG. 17, there is illustrated an example in which the vehicle body rotating type motor-integrated power trunk opening system 1 of FIG. 11 is formed of the power mechanical device 1-1 and the interlocking mechanical device 1-2 which use the elastic member 20 in common.

In the instant case, the power side elastic member 20 applied to the power mechanical device 1-1 and the interlocking side elastic member 20 applied to the interlocking mechanical device 1-2 are formed of the same coil spring, but there is a difference therebetween in that, unlike the interlocking side elastic member 20, the spring moment of the power side elastic member 20 is provided in the same manner as that of the link spring moment of the link spring 70.

Furthermore, each of the power side elastic member 20 and the interlocking side elastic member 20 is fixed to a vehicle body panel using a vehicle body fixing end portion, but there is a difference in a fixing structure of an arm fixing end portion 20-1 which is formed opposite to the vehicle body fixing end portion. For example, there is a difference in that the arm fixing end portion of the interlocking side elastic member 20 is locked to a trunk lid hinge bar, but the arm fixing end portion 20-1 of the power side elastic member 20 is locked to a protrusion formed on the fixing hinge bracket 11-2 or the trunk lid hinge bar.

As described above, the motor-integrated power trunk opening system 1 applied to the vehicle 100 according to an exemplary embodiment of the present invention includes the hinge arm 10 which is divided into a power side portion and an interlocking side portion to support left and right end portions of the trunk lid 110 covering the trunk compartment 100-1, and the actuator 30 which is mounted to the power side hinge arm 10 and moves the hinge arm 10 upwards from the trunk compartment 100-1 using generated power so that the trunk lid 110 opens. Therefore, the length of the motor torque transmitting path of the actuator 30 for the hinge arm 10 is reduced. Tanks to the common coupling structure between the actuator 30 and the hinge arm 10 which is formed of he motor and link, the number of assembly processes can be reduced, so that the overall structure can be simplified, the ease of assembly can be improved, and operational noise can be mitigated.

A power trunk opening system used in a vehicle according to an exemplary embodiment of the present invention has a motor-integrated structure and thus provides the following functions and effects.

First, the structure of the power trunk opening system can be simplified because a motor, a link, and a hinge arm are directly coupled to each other without a separate mounting bracket mounted to a vehicle body. Second, the vehicle the ease of assembly for the power trunk opening system can be improved because the number of assembly processes is reduced compared to that of the case where the mounting bracket having a three-point bolting structure is used. Third, the power trunk opening system can be assembled with the vehicle body without use of a separate tool because a pin coupling structure is used to provide the coupling force. Fourth, the production cost and the weight of the power trunk opening system can be reduced due not to the simple structure thereof but also to a reduction in the number of bolts. Fifth, Tanks to a common coupling structure of the motor, the like, and the hinge arm, the size of a mounting portion can be reduced. Accordingly, when the power trunk opening system is operated, not only can vibrations generated from the motor be reduced, but operational noise resulting form a power transmitting system can also be reduced.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power trunk opening system comprising:
   an actuator directly mounted to a hinge arm and configured to generate power in a response to an operating signal of a control switch and to move the hinge arm upwards from a trunk compartment so that a trunk lid having a predetermined weight opens,
   wherein the actuator includes:
      a motor device coupled with the hinge arm such that rotating force generated by an operation of the motor device in a response to the operating signal is transmitted to the hinge arm; and
      a link device fixed to a vehicle body panel of the trunk compartment and coupled to or integrated with the motor device such that the link device along with the motor device is rotated by a rotation of the motor device and thus makes movement of the hinge arm.

2. The power trunk opening system of claim 1, wherein the motor device and the link device are formed using a hinge arm rotating structure, and wherein the hinge arm rotating structure is embodied by a shift fixing structure in which the motor device is rotated relative to the hinge arm so that an intersection angle formed between the motor device and the hinge arm changes, and by a completely fixing structure in which the link device rotates along with the motor device, or is embodied by a completely fixing structure in which the motor device rotates along with the hinge arm, and by a shaft fixing structure in which the link device rotates relative to the motor device.

3. The power trunk opening system of claim 2,
   wherein the motor device includes a motor gear configured to be rotated by a motor that generates the rotating force, and
   wherein the link device includes a motor link and a hinge arm link coupled to each other by a link shaft to be foldable onto each other.

4. The power trunk opening system of claim 3,
   wherein the motor gear changes the intersection angle using the rotating force generated by the motor such that the hinge arm is moved upward in a shaft fixing state of the hinge arm and the motor gear, and
   wherein the motor link rotates interlocking with a change in the intersection angle in the completely fixing state with the motor gear and thus is folded onto the hinge arm link coupled thereto by the link shaft.

5. The power trunk opening system of claim 3, wherein the shaft fixing structure is formed by coupling a guide hinge bracket of the hinge arm with a motor bracket of the motor gear using a motor rotation shaft, and a rotation of the motor gear is performed with the motor rotation shaft as a center of the rotation.

6. The power trunk opening system of claim 5, wherein the motor bracket is configured such that the motor rotation shaft is coupled with the hinge arm by a guide pin.

7. The power trunk opening system of claim 3, wherein the completely fixing structure is formed by coupling or integrating the motor link and the motor gear with each other.

8. The power trunk opening system of claim 3,
   wherein the rotating force of the motor gear generated by the motor is configured to move the hinge arm upward in a completely fixing state of the hinge arm and the motor gear, and
   wherein the motor link rotates interlocking with the motor gear to change the intersection angle in the shaft fixing state of the motor link and the motor gear and thus is folded onto the hinge arm link coupled thereto by the link shaft.

9. The power trunk opening system of claim 8, wherein the completely fixing structure is formed by coupling a guide hinge bracket of the hinge arm with a motor bracket of the motor gear using a motor fixing shaft, and the motor bracket is coupled with the hinge arm by a guide pin when the motor fixing shaft passes through the motor bracket.

10. The power trunk opening system of claim 8, wherein the shaft fixing structure is formed by a gear shaft which is coupled to the motor gear while passing through the motor link.

11. The power trunk opening system of claim 3, wherein the link device further includes a link spring configured to generate a spring moment when the motor link and the hinge arm link are folded onto each other around the link shaft, and the link spring is fixed at respective opposite end portions thereof to the hinge arm link and the link shaft.

12. The power trunk opening system of claim 1,
wherein the motor device and the link device are formed using a vehicle body rotating structure, and
wherein the vehicle body rotating structure is embodied by a shaft fixing structure in which the motor device rotates relative to the vehicle body panel, and a completely fixing structure in which the link device rotates along with the motor device and thus pushes or pulls the hinge arm to move the hinge arm upward.

13. The power trunk opening system of claim 12,
wherein the motor device includes a motor gear configured to be rotated by a motor that generates the rotating force, and a vehicle body ball joint coupled with a joint bracket fixed to the motor gear, and fixed to the vehicle body panel, and the motor gear rotates relative to the vehicle body panel using the rotating force generated by the motor and rotates a motor link, and
wherein the link device includes the motor link and a hinge arm link coupled to each other by a hinge pin to be foldable onto each other, and the hinge arm link pushes or pulls the hinge arm by a rotation of the motor link in a state in which the hinge arm link is fixed with the hinge arm.

14. The power trunk opening system of claim 13, wherein the motor link and the hinge arm link form a bent structure relative to a link hinge pin and is disposed ahead of or behind the hinge arm in a closed state of the trunk lid, the bent structure further includes a link spring, and the link spring is fixed at respective opposite end portions thereof to the hinge arm link and a link shaft and thus generates a spring moment when the motor link and the hinge arm link are folded onto each other around the link shaft.

15. The power trunk opening system of claim 12,
wherein the motor device includes a motor gear to be rotated by a motor that generates the rotating force, and a gear fixing shaft fixed to the vehicle body panel and fixed to the motor gear, and the motor gear rotates relative to the vehicle body panel using the rotating force generated by the motor and rotates the motor link, and
wherein the link device includes a motor link and a hinge arm link coupled to each other by a hinge pin to be foldable onto each other, and the hinge arm link pushes or pulls the hinge arm by a rotation of the motor link in a state in which the hinge arm link is fixed with the hinge arm by a link ball joint.

16. The power trunk opening system of claim 15, wherein the motor link and the hinge arm link form a bent structure relative to a link hinge pin and is disposed ahead of or behind the hinge arm in a closed state of the trunk lid, the bent structure further includes a link spring, and the link spring is fixed at respective opposite end portions thereof to the hinge arm link and a link shaft and thus generates a spring moment when the motor link and the hinge arm link are folded onto each other around the link shaft.

17. The power trunk opening system of claim 1, wherein the hinge arm is divided into a power side hinge arm and an interlocking side hinge arm to support first and second end portions of the trunk lid, and the actuator is mounted to the power side hinge arm.

18. A vehicle comprising:
a power trunk opening system configured such that a motor device configured to generate rotating force rotates relative to a hinge arm and changes an intersection angle formed between the motor device and the hinge arm so that a link device fixed to the motor device is folded by rotation by the motor device and thus moves the hinge arm upwards thereof, or the motor device moves the hinge arm upward and the link device is folded by rotation interlocked with the motor device and thus changes the intersection angle; and
a trunk compartment provided with a trunk lid supported by the hinge arm so that the trunk lid is opened by the power trunk opening system,
wherein the motor device is directly coupled with the hinge arm.

19. A vehicle comprising:
a power trunk opening system configured such that a motor device configured to generate rotating force rotates relative to a vehicle body panel and thus rotates a link device fixed to the motor device, and the rotation of the link device makes a hinge arm be pushed or pulled so that the hinge arm is moved upward thereof; and
a trunk compartment provided with a trunk lid supported by the hinge arm so that the trunk lid is opened by the power trunk opening system,
wherein an operation of the motor device makes a motor, a motor gear, and a motor link rotate around first and second ball joints or a gear fixing shaft.

* * * * *